(12) United States Patent
Ammundi

(10) Patent No.: US 8,316,151 B1
(45) Date of Patent: Nov. 20, 2012

(54) MAINTAINING SPATIAL ORDERING IN FIREWALL FILTERS

(75) Inventor: Anand Ammundi, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 928 days.

(21) Appl. No.: 12/392,659

(22) Filed: Feb. 25, 2009

(51) Int. Cl.
*H04L 29/06* (2006.01)

(52) U.S. Cl. .............. 709/240; 726/1; 709/239

(58) Field of Classification Search ...... 726/1; 709/239, 709/240
See application file for complete search history.

(56) References Cited

U.S. PATENT DOCUMENTS

| | | | |
|---|---|---|---|
| 6,526,052 B1 * | 2/2003 | Rijhsinghani et al. | 370/389 |
| 7,554,980 B1 * | 6/2009 | Yeh et al. | 370/392 |
| 2003/0225964 A1 * | 12/2003 | Krishnan et al. | 711/108 |
| 2005/0083935 A1 * | 4/2005 | Kounavis et al. | 370/392 |
| 2010/0149980 A1 * | 6/2010 | Cheung et al. | 370/235 |

OTHER PUBLICATIONS

McGeer et al. "Minimizing Rulesets for TCAM Implementation" Apr. 2009, INFOCOM 2009 IEEE, pp. 1314-1322.*

* cited by examiner

*Primary Examiner* — Kambiz Zand
*Assistant Examiner* — Michael Guirguis
(74) *Attorney, Agent, or Firm* — Harrity & Harrity, LLP

(57) ABSTRACT

A network device may be configured to filter network traffic using multiple filters bound to different interfaces, such as different ports or other logical interfaces associated with the network device. Multiple filters may be merged to obtain a number of merged filter sets. A rank may be calculated for the merged filter sets and used to maintain a required ordering of the merged filter sets when performing a lookup.

23 Claims, 22 Drawing Sheets

```
T1 {  [match IP Source Address 1.1.1.1   ~510
       match source port 100]            ~515
       action counter                    ~520
   }

T2 {  [match IP Source Address 2.2.2.2
       match source port 200
       match protocol UDP]
       action discard
   }

T3 {  [match IP Source Address 2.2.2.12
       match source port 200
       match destination port 220]
       action discard
   }
```

Fig. 5B

```
710 →    Filter F1  {  [match IP Source Address 1.1.1.1]
                       action accept
         }

720 →    Filter F2  {  [match source port 100]
                       action counter
         }

730 →    Filter F3  {  [match destination port 200]
                       action discard
         }
```

Fig. 7

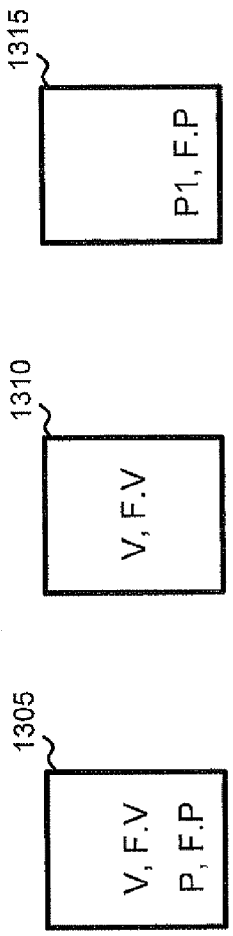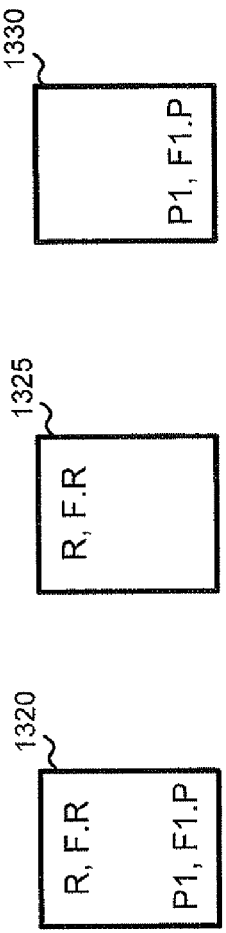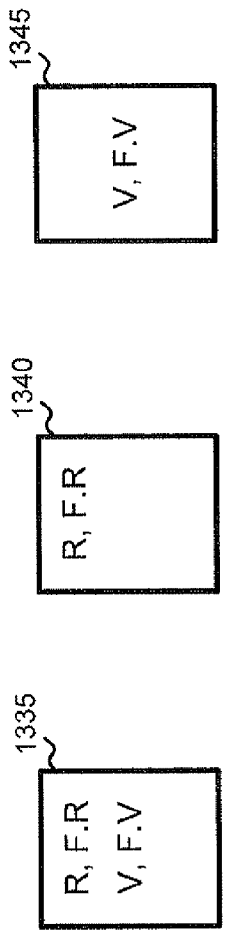

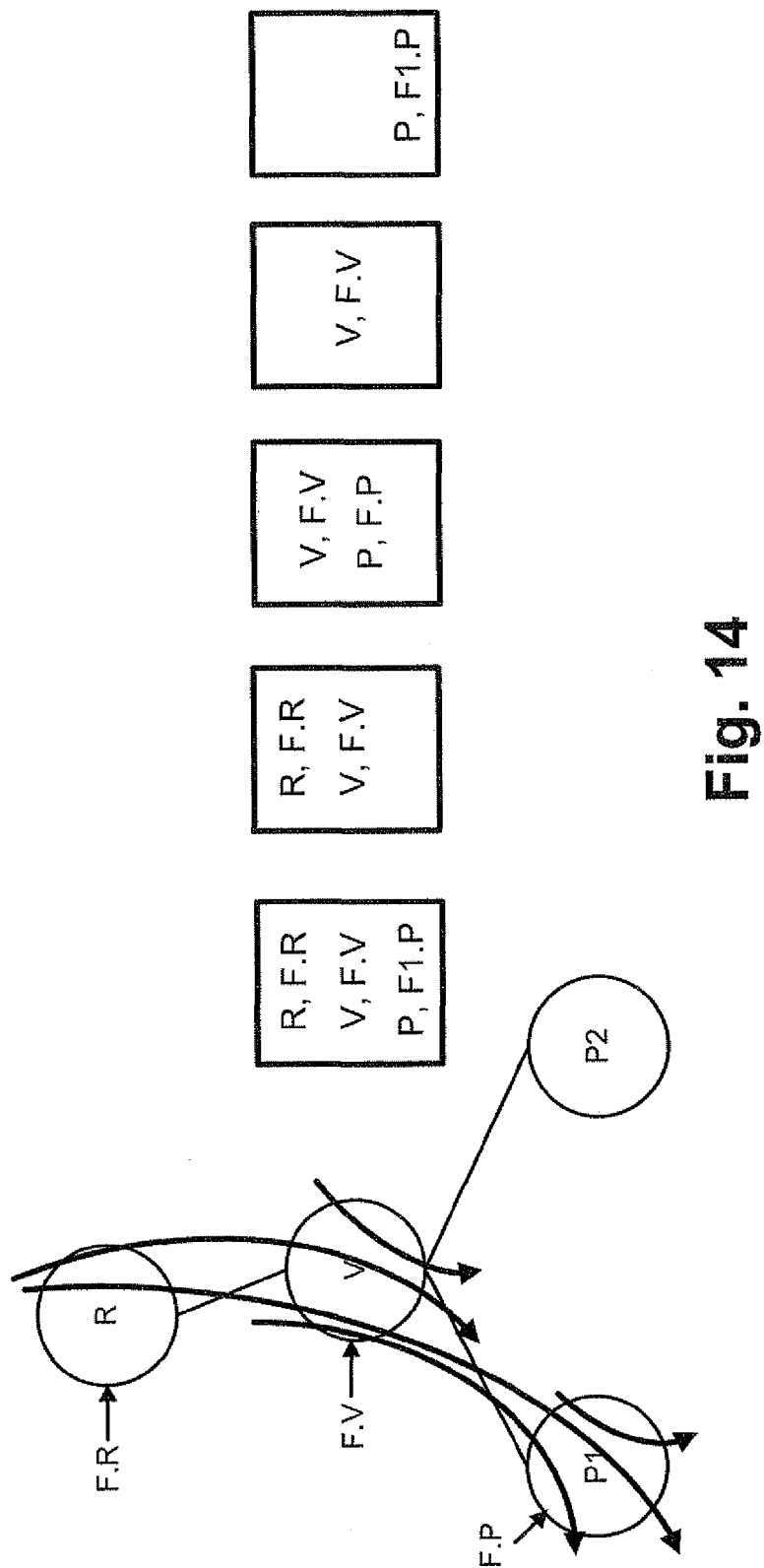

MAINTAINING SPATIAL ORDERING IN FIREWALL FILTERS

BACKGROUND

Computing and communication networks typically include devices, such as routers, switches or gateways, which transfer or switch data, such as packets, from one or more sources to one or more destinations. A packet is a structure that encapsulates data for transmission through a network based on control information that is stored in a header portion of the packet. A router is a switching device that can receive a packet and, based on the packet header, may forward the packet towards its final destination.

A firewall is a device that inspects network traffic passing through it, and may perform actions, such as denying or permitting passage of the traffic based on a set of rules. Firewalls may be implemented as stand alone network devices or, in some cases, integrated in a single network device, such as a router or switch, which performs other functions. For instance, a network switch may perform firewall related functions as well as switching functions.

SUMMARY

One implementation is directed to a network device that includes logic to identify a merge graph including one or more nodes, where each node includes one or more merge-points and where each merge-point is defined as a filter associated with an interface in the network device, and each node being representable in a ternary content-addressable memory (TCAM) as one or more entries programmed into the TCAM. The network device may further include logic to rank the nodes in the merge graph and logic to program the TCAM based on the nodes in the merge graph, where the TCAM is programmed so that the TCAM entries have a priority order determined based on the rank of the nodes.

In another implementation, a method may include identifying a merge graph that includes one or more nodes, where each node includes one or more merge-points and where each merge-point is defined as a filter associated with an interface in a network device, and each node being representable in a TCAM as one or more entries programmed into the TCAM. The method may further include ranking the nodes relative to one another based on the interfaces associated with the filters of the nodes and updating the TCAM entries to maintain a spatial order in the TCAM based on a result of the ranking of the nodes.

In yet another implementation, a device may include logic to identify a merge graph including one or more nodes, where each node includes one or more merge-points and where each merge-point is defined as a filter associated with an interface in the device, and each node being representable in a ternary content-addressable memory (TCAM) as one or more entries programmed into the TCAM. The device may further include logic to rank the nodes in the merge graph and logic to assign labels to entries corresponding to the nodes. The device may further include logic to associate forward and backward dependency pointers with the nodes to track relative rankings of the nodes; and logic to update the TCAM in response to a change in the merge graph by programming the entries for the nodes into the TCAM in a spatial order based on the ranks of the nodes, the labels, and the forward and backward dependency pointers.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIGS. 5A and 5B are diagrams illustrating an exemplary firewall filter;

FIG. 7 is a diagram illustrating three exemplary firewall filters;

FIGS. 13A-13D are diagrams of merge graphs corresponding to the walks shown in FIGS. 12A-12D, respectively;

FIG. 14 is a diagram illustrating, after pruning, the relationship map and corresponding merge graph shown in FIGS. 12D and 13D, respectively;

DETAILED DESCRIPTION

The following detailed description of the invention refers to the accompanying drawings. The same reference numbers in different drawings may identify the same or similar elements. Also, the following detailed description does not limit the invention.

As described herein, a network device, such as a firewall, may be configured to filter network traffic. Multiple filters may be implemented by a single firewall and different filters may be bound to different interfaces, such as different ports or other logical interfaces associated with the firewall. The merged filter sets may embody a spatial ordering that may need to be maintained. A rank may be calculated for the merged filter sets and used to maintain the required spatial ordering.

Exemplary System Overview

Figure 1:
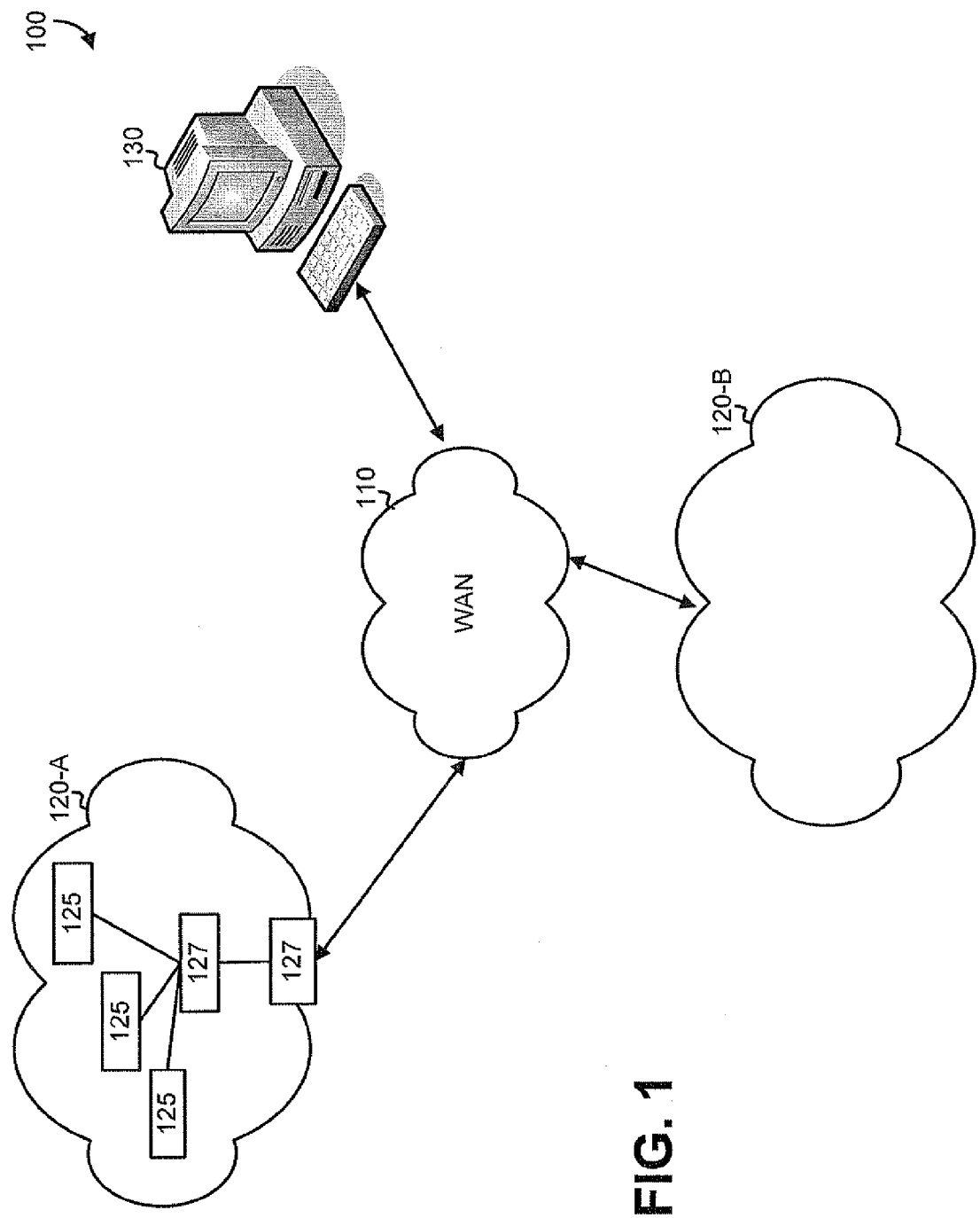
FIG. 1 is a diagram of an exemplary system in which concepts described herein may be implemented.

FIG. 1 is a diagram of an exemplary system 100 in which concepts described herein may be implemented. System 100 may include a wide area network (WAN) 110 connected to one or more private networks 120-A and 120-B (collectively referred to as private networks 120) and a computing device 130. Private networks 120 may each, for example, include corporate or individual local area networks (LANs).

WAN 110 may generally include one or more types of networks. For instance, WAN 110 may include a cellular network, a satellite network, the Internet, or a combination of these networks that that are used to transport data. Although shown as a single element in FIG. 1, WAN 110 may include a number of separate networks that function to provide services to private networks 120 and computing devices, such as computing device 130.

Private networks 120 may each include a number of computing devices, such as, for example, client computing stations 125, and network devices 127. Client computing stations 125 may include computing devices of end-users, such as desktop computers or laptop computers. Network devices 127 may include, for example, firewalls, switches, routers, combinations of these devices, or other devices relating to network implementation, control, and/or security.

Computing device 130 may include, for example, a laptop or personal computer connected to WAN 110. Alternatively, computing device 130 may include a mobile device, such as a cell phone, etc.

In the exemplary system shown in FIG. 1, a single WAN 110, two private networks 120-A and 120-B, and a single computing device 130 are shown. In other implementations, system 100 may include additional, fewer, different, or differently arranged networks and/or devices.

Exemplary Device Architecture

Figure 2:
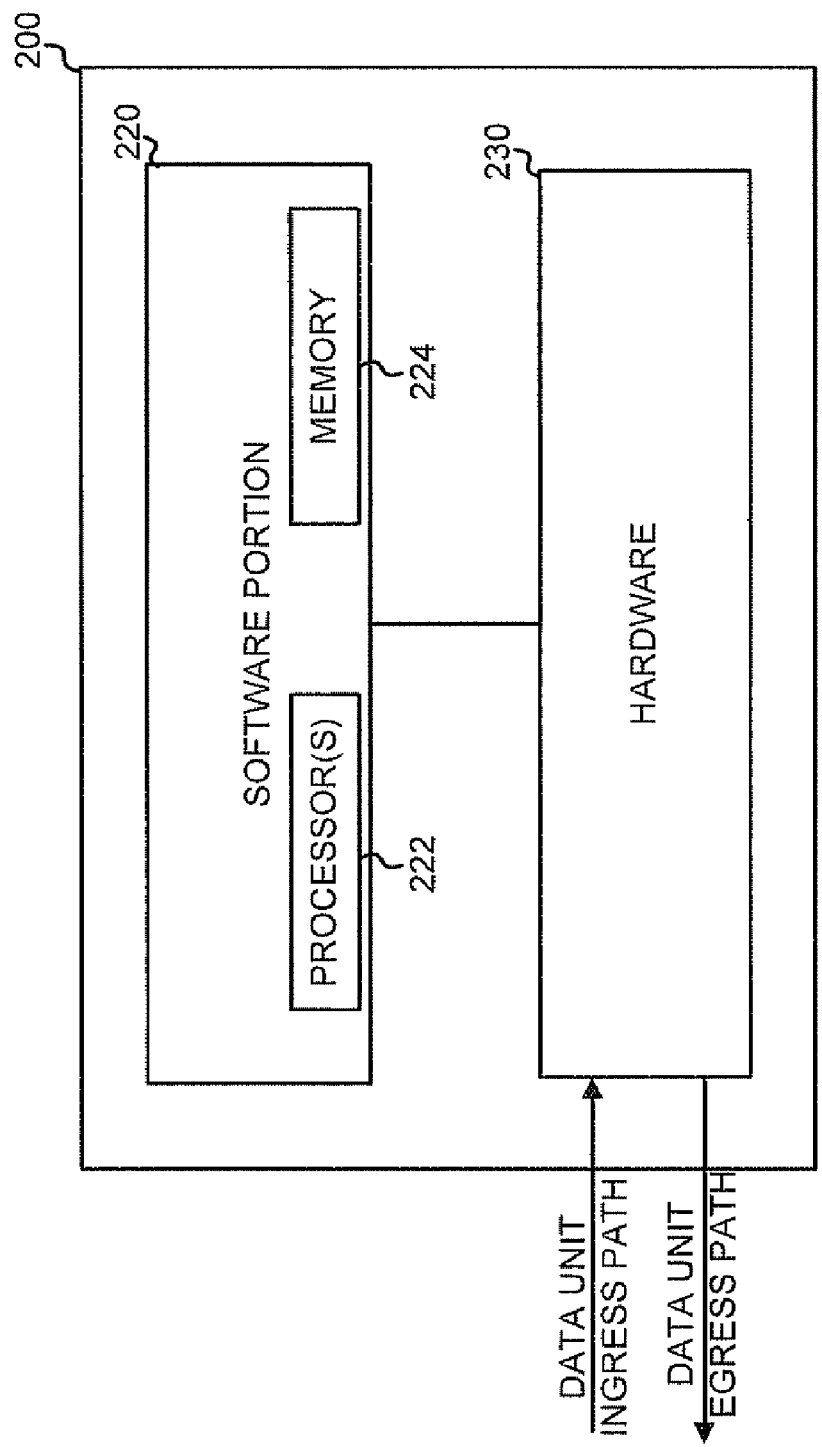
FIG. 2 is a block diagram of an exemplary firewall.

In one exemplary implementation, network devices 127 may include functionality relating to network data inspection (e.g., a firewall). FIG. 2 is a block diagram of an exemplary firewall 200, which may correspond to one of network devices 127 that is a dedicated firewall or includes an integrated firewall. In order to increase its performance, firewall 200 may use dedicated hardware to process or assist in processing incoming data units, where a data unit is defined as packet-based or non-packet based information. As shown in FIG. 2, firewall 200 may include a software portion 220 and a hardware portion 230.

Software portion 220 may include software designed to control firewall 200. For example, software portion 220 may control hardware portion 230 and provide an interface for user configuration of firewall 200. In general, software portion 220 may implement the functions of the firewall that are not time critical. Software portion 220, although shown as a single abstract block in FIG. 2, may be implemented through, for example, one or more general purpose processors 222 and one or more computer memories 224. Processors 222 may include processors, microprocessors, or other types of processing logic that may interpret and execute instructions. Computer memories 224 (also referred to as computer-readable media herein) may include random access memory (RAM), read-only memory (ROM), or another type of dynamic or static storage device that may store information and instructions for execution by processors 222.

Hardware portion 230 may include circuitry for efficiently processing data units received by network device 200. Hardware portion 230 may include, for example, logic, such as an application specific integrated circuit (ASIC), a field programmable gate array (FPGA), and/or a content-addressable memory (CAM). Hardware portion 230 may, for example, receive incoming data units, extract header information for the data units, and process the data units based on the extracted header information.

Although firewall 200 is shown as including a software portion 220 and a hardware portion 230, firewall 200 may, in some implementations, be implemented entirely through hardware.

Firewall 200 may inspect network traffic passing through the device (e.g., network device 127) and may perform actions, such as to deny or permit passage of the traffic based on rules defined for firewall 200. To maximize the performance of firewall 200, the comparison of the incoming traffic to the firewall rules may be made in hardware portion 230.

Figure 3:
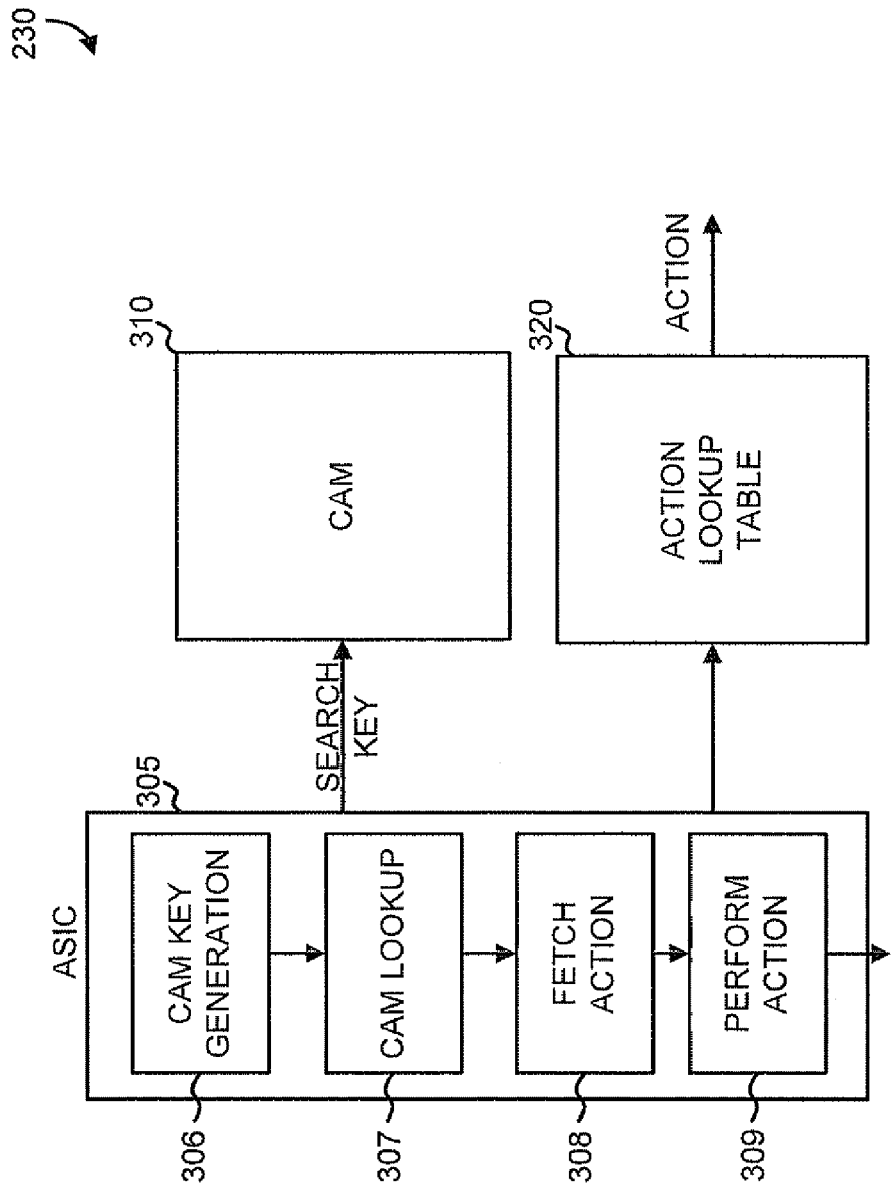
FIG. 3 is a diagram illustrating components in a hardware portion of a firewall that may be used by the firewall in inspecting network traffic.

FIG. 3 is a diagram illustrating components in hardware portion 230 that may be used by firewall 200 in inspecting network traffic. Hardware portion 230 may include a control application specific integrated circuit (ASIC) 305, content-addressable memory (CAM) 310, and an action lookup table 320.

ASIC 305 may generally orchestrate or perform control functions for accessing CAM 310 and action lookup table 320. ASIC 305 may, for instance, form a search key for CAM 310 and input the search key to CAM 310. ASIC 305 may also control the lookup of action lookup table 320. ASIC 305 may also handle updating and/or programming of CAM 310 and action lookup table 320.

A CAM, in general, is a type of associative computer memory that is designed for high-speed searching applications. Unlike standard random access computer memory in which the memory returns a data word based on a supplied address, CAM 310 may be designed such that, in response to a data word, CAM 310 may perform a parallel search of its entire memory to determine if that data word is stored. If the data word is found, CAM 310 may return a list of the storage addresses where the data word was found.

In one implementation, CAM 310 may particularly be a ternary CAM (TCAM). A TCAM is a CAM that allows states in the CAM to be specified as "don't care" states. For example, a TCAM might have an entry such as "10XX0," where "X" indicates the "don't care" state. This entry will match any of the four search keys: "10000," "10010," "10100," or "10110." TCAMs may be implemented for two entries that are written to the TCAM for each search item: a first entry corresponding to the pattern that is to be matched; and a second "mask" entry that specifies which fields in the first entry are "don't care" states. For instance, for the exemplary entry "10XX0," two values may be written to the TCAM. The first value may be the pattern and the second value may be the mask entry "11001," where a "0" indicates that the corresponding data in the pattern is to be masked (i.e., it is a "don't care" state). In an alternative possible implementation, a "1" value in the mask can indicate a "don't care" state.

The address of the highest priority match that corresponds to a particular search key may, after output by CAM 310, be input to action lookup table 320 to obtain an action corresponding to the match. The action may be, for example, drop (discard) the corresponding data unit, accept (i.e., pass or do not drop) the data unit, increment a counter, or other actions. The action may then be implemented by a subsequent section of hardware portion 230 or by software portion 220. The priority for the highest priority match may be defined by, for example, lower address values in CAM 310 having higher priority (i.e., the highest priority is at the first row of CAM 310 and the lowest priority is the last row). In other implementations, priority may be defined differently.

As further shown in FIG. 3, ASIC 305 may perform exemplary operations with the following components: a CAM key generation component 306, a CAM lookup component 307, a fetch action component 308, and a perform action component 309. Each component 306, 307, 308, and 309 may correspond to a specific portion of ASIC 305. Each of the operations may be performed by ASIC 305 for each received data unit. CAM key generation component 306 may generate a search key corresponding to the data unit. For example, for a packet, a key may be constructed that includes portions that represent: a source port for the packet, a destination port for the packet, a source Internet Protocol (IP) address for the packet, and a destination IP address for the packet. The key may be input to CAM 310, which may return a list of a subset of the entries in CAM 310 that match the key or, alternatively, CAM 310 may return only the highest priority entry that matches the key. CAM lookup component 307 may control the input of the key to CAM 310.

ASIC 305, through CAM lookup component 307, may fetch the action for the data unit based on the lookup of CAM 310. The result of the lookup of CAM 310 may be used by fetch action component 308 to fetch the action that is to be performed on the data unit from action lookup table 320. Perform action component 309 may perform this action on the data unit. As previously mentioned, the action may include, for instance, dropping the data unit, accepting (i.e., not dropping) the data unit, or incrementing a counter based on the data unit.

In summary, the operation of firewall 200 in filtering data units may include receiving a data unit (e.g., a packet), constructing a search key based on fields of the data unit, looking up the search key in CAM 310, and performing an action on the data unit based on the result of the lookup.

Figure 4:
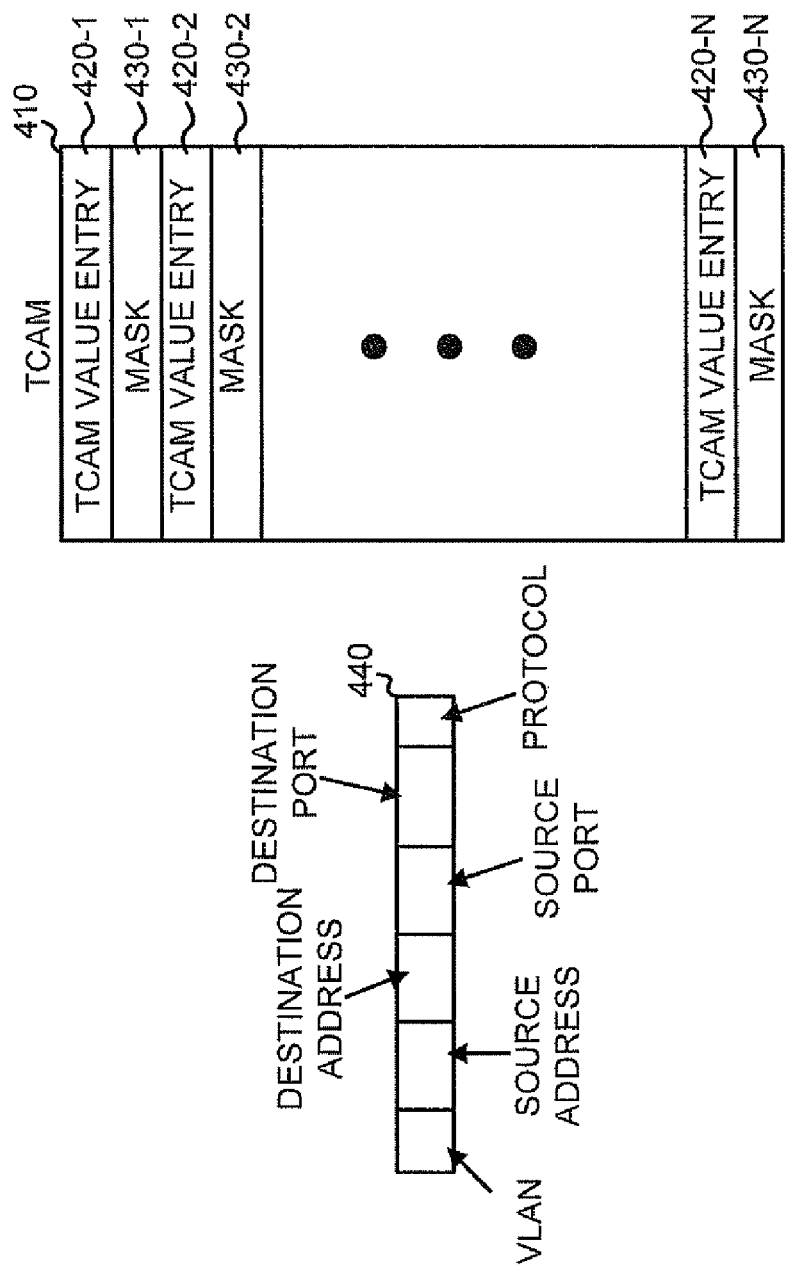
FIG. 4 is a diagram illustrating an exemplary implementation of a content addressable memory (CAM)

FIG. 4 is a diagram illustrating an exemplary implementation of CAM 310. In this example, CAM 310 may be a TCAM, labeled as TCAM 410. TCAM 410 may include a number of TCAM value entries 420-1 through 420-N. Each TCAM value entry 420 may be associated with a corresponding mask field 430-1 through 430-N. The data to store in each TCAM value entry 420 and each mask field 430 may be programmed into TCAM 410 during, for example, configuration of firewall 200.

In the example of FIG. 4, an input search key 440 may be constructed based on portions of an IP packet and may include fields based on an incoming virtual LAN (VLAN), a source address, a destination address, a source port, a destination port, and a protocol. A number of other possible fields could be included in search key 440. In some implementations, the particular fields that are to be used in a search key for firewall 200 may be programmable by the end user. Each incoming data unit may include a search key 440 constructed for the packet. In general, a search key may have fields for data elements found directly in the packet and fields for information based on where the data is received and what kind of treatment is applied to the packet.

The entire search key may then be simultaneously applied to each of TCAM value entries 420. Mask fields 430 may be applied to select which bits of each entry must match and which can be ignored. If all of the values match in all of the bit locations that are unmasked, then the corresponding entry of TCAM 410 may be considered to be a match. If multiple entries in TCAM 410 are determined to be matches, TCAM 410 may apply a priority selection scheme to output the highest priority match. For instance, value entry 420-1 may be the highest priority entry, value entry 420-2 may be the next highest priority entry, and so forth.

Firewall 200, and hence TCAM 410, may operate on a packet-by-packet basis. That is, each received packet may be looked-up in TCAM 410 and an action performed for the packet based on the lookup.

In one particular implementation, TCAM 410 may be store and process up to approximately fourteen (14) thousand entries simultaneously, where each value entry may have a width of twenty-four (24) bytes. The particularly described configuration and logical operation of TCAM 410 is exemplary (e.g., each entry may be a different number of bytes and there may be a larger or smaller number of entries stored in TCAM 410).

FIGS. 5A and 5B are diagrams illustrating an exemplary firewall filter "F1". As shown in FIG. 5A, filter F1 500 may include one or more terms labeled as terms T1, T2, and T3. Each term may be a collection of match conditions and the corresponding actions that are to be taken if the match conditions are met. Each match condition may be specified as an attribute (e.g., a source address, a destination address, a receive port, etc.) and a corresponding value for the attribute. The terms may have a logical OR relationship among themselves and the order of the terms may be relevant to the implementation of the filter. For instance, if terms T1 and T2 are satisfied, the action corresponding to the higher priority term (e.g., T1) will be performed and the action corresponding to the lower priority term (e.g., T2) will not be performed. Typically, terms occurring first in a filter have higher priority over later occurring terms.

FIG. 5B is a diagram illustrating the terms of filter F1 500 in additional detail. In particular, exemplary match conditions and actions corresponding to each term T1, T2, and T3 are shown.

As shown in FIG. 5B, term T1 may include two match conditions 510 and 515, and an action 520. Each of match conditions 510 and 515 may be specified using the term "match" followed by a match attribute and a match value. Match condition 510, for instance, may specify the attribute "IP Source Address" and the value "1.1.1.1." In other words, for this condition to be satisfied, the source IP address for a data unit should be "1.1.1.1". Match condition 515 may specify the match attribute "source port" and the value "100." Thus, for this condition to be satisfied, the source port for the data unit should be "100." If both match conditions 510 and 515 are satisfied, action 520 may be performed by firewall 200. In this case, action 520 may specify that a counter corresponding to the term is to be incremented.

Firewall 200 may implement multiple different filters, such as multiple filters F1 500, simultaneously. Additionally, different filters may be applied to different physical or logical interfaces in firewall 200. In other words, each received data unit may be subject to filtering based on multiple filters. One way to implement such a scheme would be to perform a separate lookup into TCAM 410 for each filter that is being applied. In order to maximize the performance of firewall 200, however, the number of required TCAM lookups may be minimized, as each lookup may be performed serially, which can waste time and reduce the performance of firewall 200.

Consistent with aspects described herein, firewall 200 may merge filters in order to more efficiently filter network traffic and to increase the potential functionality of firewall 200 given its finite hardware resources. The determination of which filters to group together for merging will be described in more detail below.

Network Bind Points

Filters for a firewall may be applied at different logical or physical interfaces in firewall 200. For example, in the situation in which firewall 200 is implemented in a network device that additionally implements functionality for a network switch and/or router, the device may include physical interfaces corresponding to the device ports, virtual LAN (VLAN) interfaces, and interfaces corresponding to the routing portion of the device. Each of these interfaces, when associated with a firewall filter, may correspond to a "bind-point."

Figure 6:
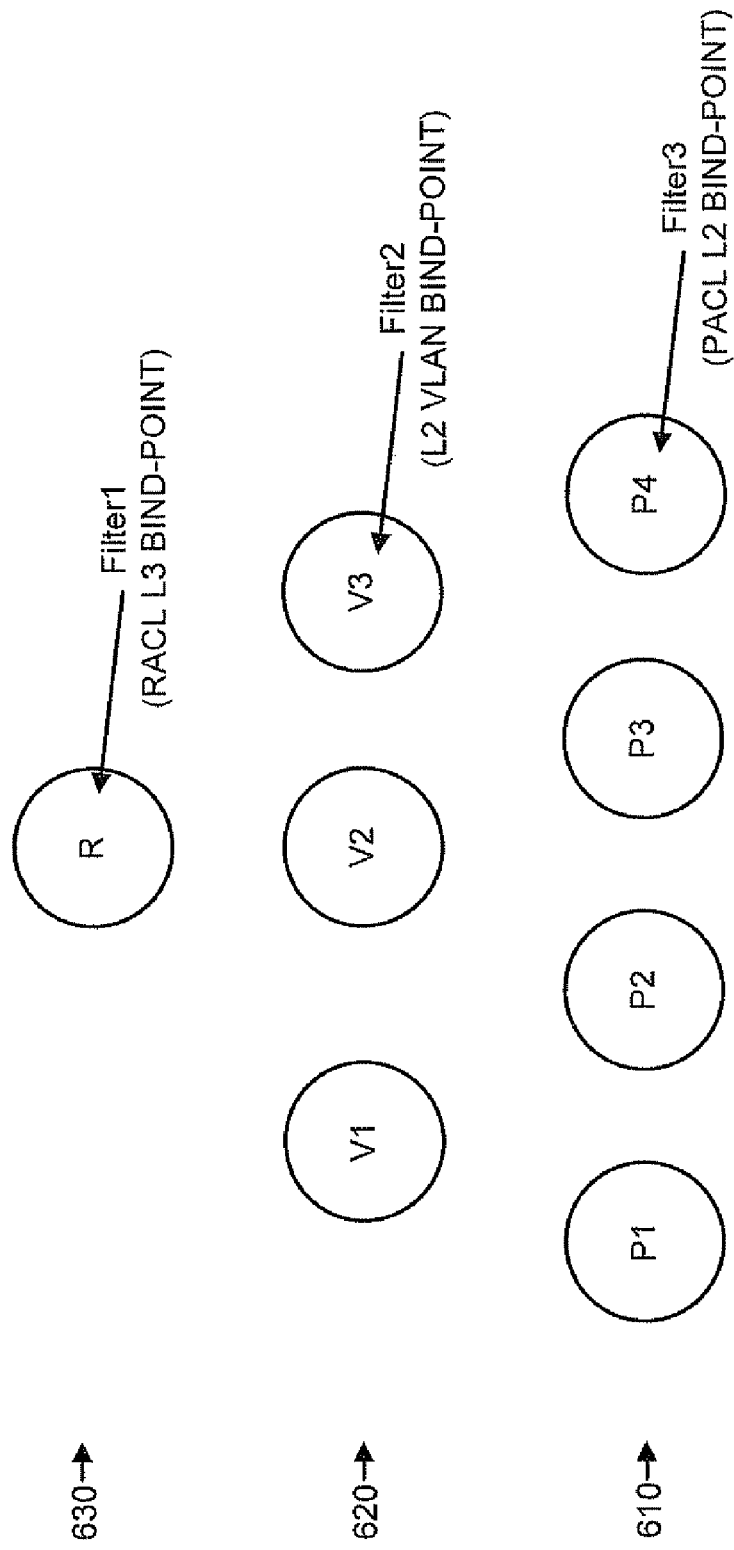
FIG. 6 is a diagram illustrating exemplary bind-points associated with a firewall.

FIG. 6 is a diagram illustrating exemplary bind-points associated with firewall 200. The bind-points may include bind-points associated with ports (P) 610, VLANs (V) 620, and router (R) 630. Ports 610 may include one or more ports, labeled as ports P1 through P4 in FIG. 6, associated with the network device that includes firewall 200. A user, configuring firewall 200, may filter traffic streams using filters that are based on filter access control lists (ACLs) that are bound to one or more of ports P1 through P4. A filter bound to a port, as this terminology is used herein, means that data units traversing the bound port are filtered. Filtering at the port level may be referred to as port ACL (PACL) based filtering. An exemplary filter, "Filter3," is shown associated with port P4. Filter3 and P4 represent an L2 bind-point.

VLANs 620 may also be defined in firewall 200. In general, VLANs 620 may allow groups of hosts to be defined that are logically treated as if they are in a single LAN, even if the hosts are physically connected to different LAN segments. VLANs 620 may include one or more VLANs, labeled as VLANs V1 through V3 in FIG. 6, associated with the network device that includes firewall 200. Traffic streams may be filtered using filters that are based on filter ACLs that are bound to one or more of VLANs V1 through V3. Filtering at the VLAN level may be referred to as VLAN ACL (VACL) based filtering. An exemplary filter, "Filter2," is shown associated with VLAN V3. Filter2 and V3 represent an L2 VLAN bind-point.

In some implementations, router 630 may also be implemented in firewall 200. Router 630 may represent the logic of the network device associated with firewall 200 that implements routing functions. Traffic streams may be filtered using filters that are based on filter ACLs that are bound to router 630. Filtering at the router level may be referred to as router ACL (RACL) based filtering. An exemplary filter, "Filter1", is shown associated with router 630. Filter1 and router 630 represent an L3 bind point.

Filter Merge

Firewall 200 may provide the ability to implement a filter at the router, VLAN, or port levels, to thus create PACL, VACL, or RACL based bind-points. From the user's perspective, the filters may be thought of as being implemented independently. That is, each relevant filter for a data unit may be sequentially applied to the data unit in the order with which the data unit passes through the bind-points. For example, a data unit that ingresses at port P1, is a member of VLAN V1, and is eventually routed through router R may have filters bound to P1 applied, followed by filters bound to V1, followed by filters bound to R.

As previously mentioned, to increase the performance of the network device, multiple filters, potentially bound to different bind points, may be merged. The merged filter rules may be written to TCAM 410 such that a single lookup into TCAM 410 will satisfy the merged filters.

To more clearly illustrate the concept of merging filters, an exemplary set of filters and a merged version of the filters will next be discussed with reference to FIGS. 7 and 8.

FIG. 7 is a diagram illustrating three exemplary firewall filters, filter F1 710, filter F2 720, and filter F3 730. Assume filter 710 is bound at the router level (RACL), filter 720 is bound at the VLAN level (VACL), and filter 730 is bound at the port level (PACL). Filter 710 may accept data units that have the source IP address "1.1.1.1," filter 720 may increment a counter for data units that are associated with source port "100," and filter 730 may discard data units that are associated with destination port "200." Further, assume that these three filters are to be applied to data units that are received at the router level, and proceed through the VLAN level to the port level. In other words, the filters should logically be applied in order of filter 710, filter 720, and then filter 730.

Figure 8:
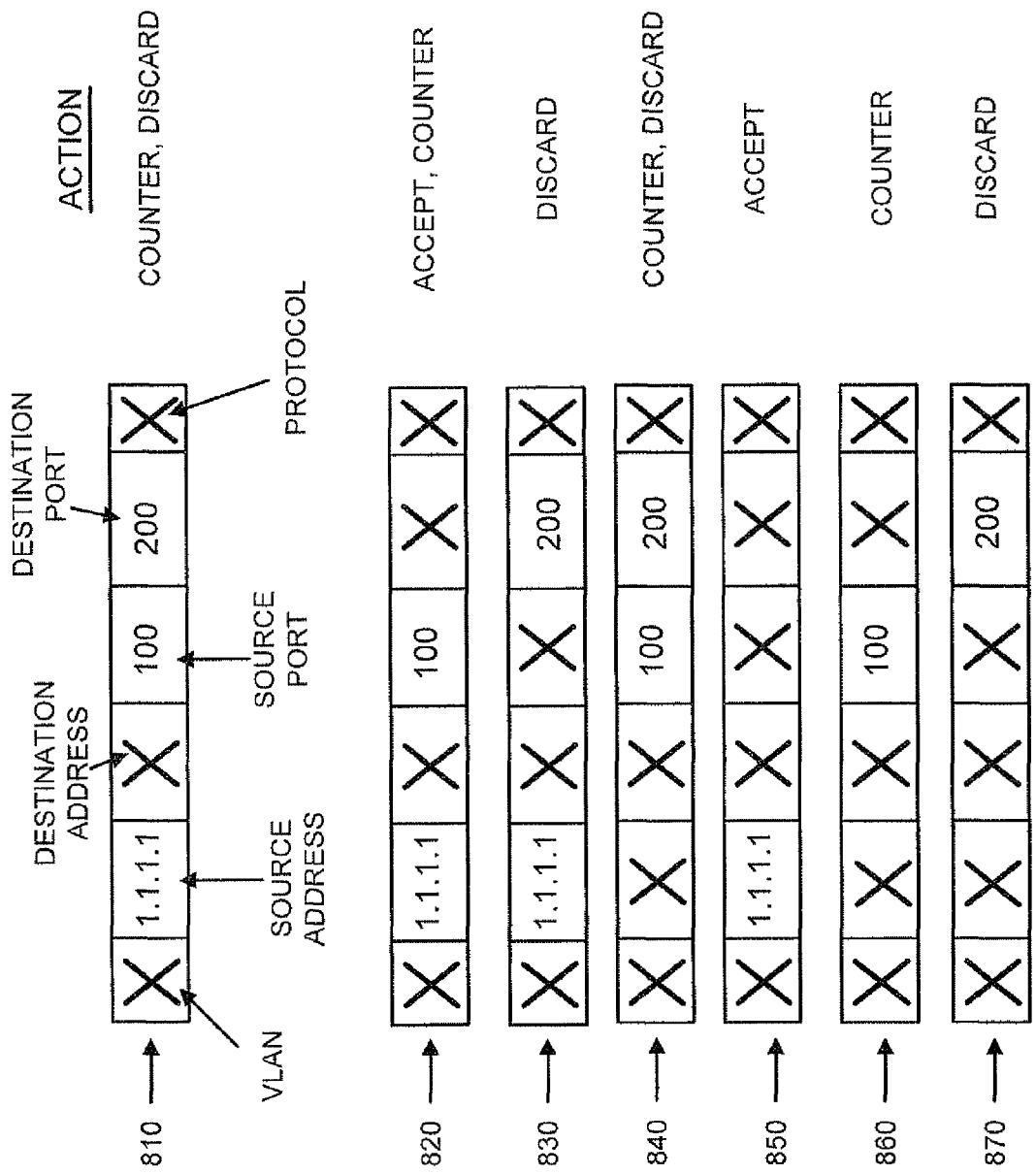
FIG. 8 is a diagram illustrating a set of entries that may be written to a ternary CAM (TCAM) to represent a merged set of filters.

FIG. 8 is a diagram illustrating a set of entries 810, 820, 830, 840, 850, 860, and 870 that may be written to TCAM 410 to represent a merge of filters 710, 720, and 730. Each entry 810, 820, 830, 840, 850, 860, and 870 is shown using the search format shown for search key 440 (FIG. 4). To the right of each entry is listed the action(s) that should be taken when the entry is satisfied. For each entry, an "X" indicates a don't care ("X") condition. In FIG. 8, fields corresponding to actual values (i.e., source address and source port for entry 820) and the don't care conditions are shown in a single graphical block. When physically implemented in TCAM 410, however, the data values may be written to TCAM 410 as part of a TCAM value entry 420 and the "don't care" conditions may be written to TCAM 410 as part of a corresponding mask entry 430.

As shown in FIG. 8, the merged version of filters 710, 720, and 730 may include seven entries that are to be written to TCAM 410. Entry 810 may include a match condition from each filter 710, 720, and 730. Entries 820, 830, and 840 may each include a condition from two of the three filters, and entries 850, 860, and 870 may each include a condition from a single one of filters 710, 720, and 730. The seven separate entries 810-870 may correspond to all possible results of the three filters evaluated serially. The seven separate entries 810-870, however, may be evaluated in one TCAM lookup. Entries 810-870 may be written to TCAM 410 in a priority order in which entry 810 has the highest priority and entry 870 has the lowest priority. If multiple entries are matched in a lookup into TCAM 410, the actions corresponding to the highest priority entry may be performed.

Merging Filters Using Merge Graphs

Figure 9:
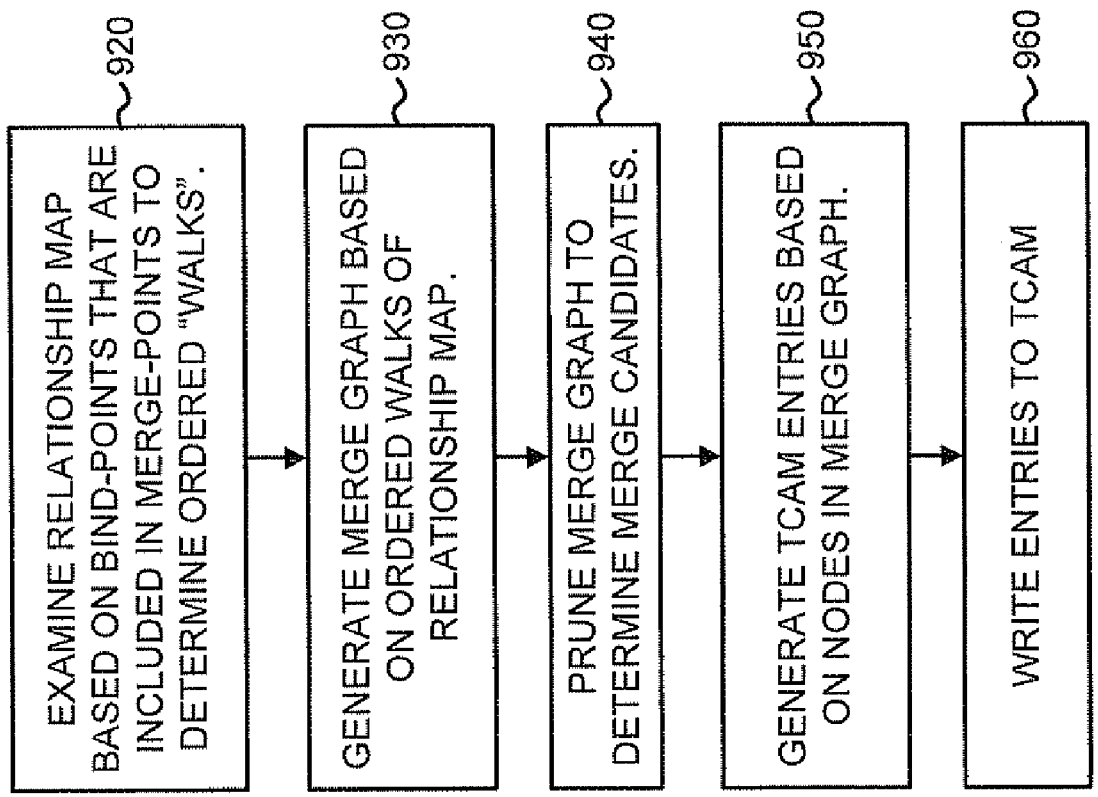
FIG. 9 is a flow chart illustrating exemplary operations through which a firewall may configure itself to use merged filter sets.

The operation of firewall 200 in merging of multiple filters, potentially applied to different interfaces in firewall 200, will now be described. FIG. 9 is a flow chart illustrating exemplary operations through which firewall 200 may configure hardware portion 230 to use merged filters.

Firewall 200 may determine the merge candidates that are to be serviced by a single lookup into TCAM 410. A "merge-point," as used herein, may refer to a filter bound to a particular bind point. In other words, each merge-point may be defined by a [filter, bind point] tuple. For each incoming merge-point, firewall 200 may add the merge-point as a node to a merge graph for the firewall. If no merge graph currently exists, then the node becomes the merge graph. Exemplary merge graphs are illustrated in FIGS. 13A-13D and will be described in additional detail below. Firewall 200 may merge the merge-points associated with a single TCAM lookup to obtain a number of TCAM entries that represent the merged version of the corresponding filters, such as the exemplary merged entries shown in FIG. 8.

Two types of merge-sets may be defined: a concurrent merge and a containment merge. A concurrent merge may be defined as multiple filters that are bound to the same bind point and that should be serviced by the same lookup. A containment merge may be defined as the set of filters that are associated with different bind-points but that are related such that the filters need to be merged to be implemented by a single lookup. Each filter may be, for example, manually associated (bound) with its bind-point by an administrator As illustrated in FIG. 9, firewall 200 may generate a merge graph that can be used to generate the TCAM entries corresponding to the merge candidates.

Figure 10:
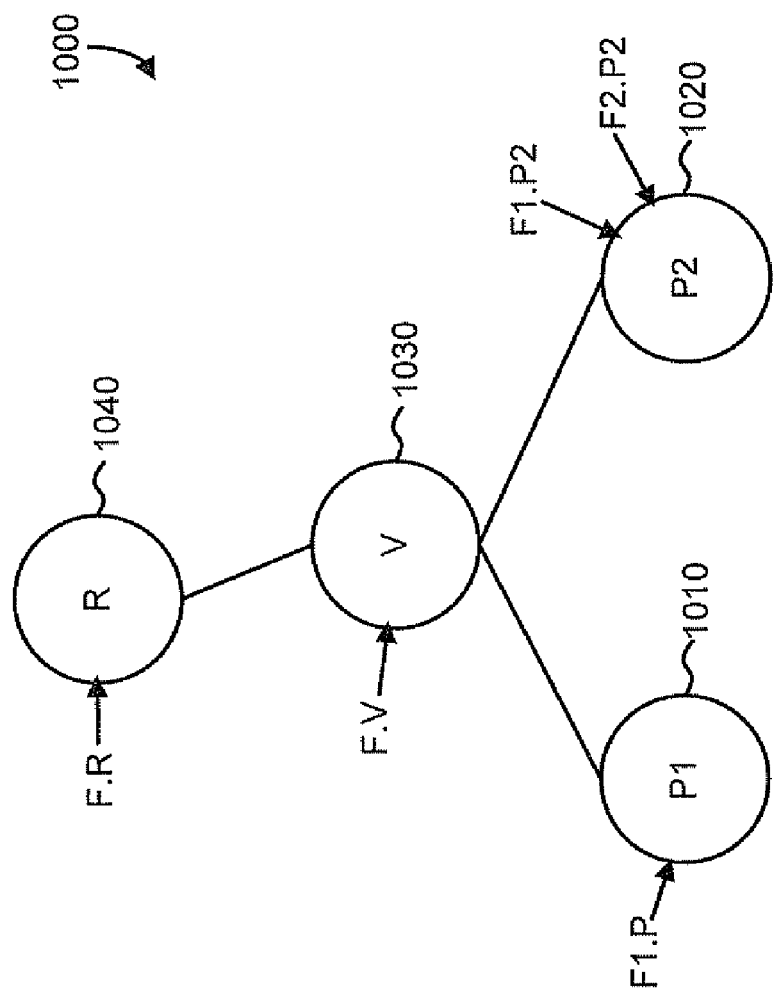
FIG. 10 is a diagram illustrating an exemplary bind-point relationship map for a set of bind-points.

A bind-point relationship map may be examined based on bind-points that are included in the merge-points to determine ordered "walks" through the relationship map (block 920). The bind-point relationship map may describe the topology of the logical and/or physical interfaces (bind-points) associated with firewall 200 (i.e., the merge-points). The relationship map may incorporate the relationships between bind-points associated with firewall 200. FIG. 10 is a diagram illustrating an exemplary bind-point relationship map 1000 for a set of bind-points. Although bind-point relationship map 1000 is shown as a graphic map to illustrate the relationship between its bind-points, firewall 200 may store the relationship map as a data structure that may not necessarily be graphically displayed or represented.

As shown in FIG. 10, the bind points include PACL bind-points P1 1010 and P2 1020, VACL bind-point V 1030, and RACL bind-point R 1040. In this relationship map, bind-point V 1030 is a member of bind-point R 1040 and bind-points P1 1010 and P2 1020 are members of bind-points V 1030. Further, assume a number of filters are associated with the different bind-points. Each filter may be, for example, manually associated with its bind point by an administrator. In particular, assume filter "F1.R" is bound to bind-point R 1040, filter "F1.V" is bound to bind-point V 1030, filter "F1.P" is bound to bind-point P1 1010, and filters "F1.P2" and "F2.P2" are bound to bind-point P2 1020.

Returning to FIG. 9, based on the relationship map, firewall 200 may generate a merge graph (block 930). The merge graph may be particularly created based on ordered "walks" of the relationship map (block 930). The nodes of the merge graph may each include merge points that will be merged to create a set of TCAM entries for the node. The ordered walk may be thought of as a traversal of the bind-points in the relationship map to obtain a set of merge-points for each walk. The merge-points may be empty or active based on whether or not a filter is bound to a bind-point. A walk may be conceptualized as a representation of all possible paths a data unit will take and the filters that will be applied for each particular path. A walk may begin at a bind-point and may proceed downward (or upward) based on the relationship map. For example, for the bind-points shown in FIG. 6, a data unit may be routed through R 630, switched at one of VLANs 620 (e.g., V1), and then egress out of one of ports 610 (e.g., P1).

The merge graphs generated based on the ordered walks may be based on the direction of a data unit though the firewall (i.e., an ingress data unit or an egress data unit). In other words, a separate merge graph may be generated for the ingress and egress directions. The examples described below illustrate the egress path for a data unit.

Figure 11B:
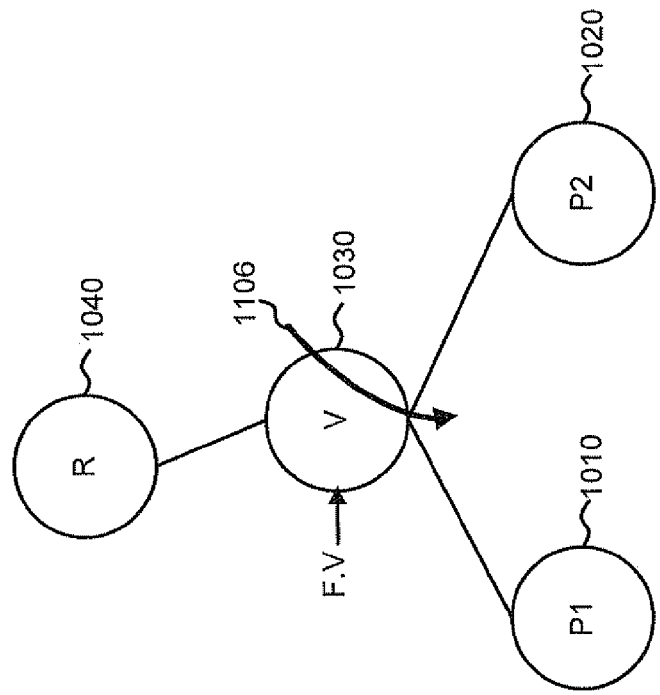
FIGS. 11A-11C are diagrams illustrating exemplary walks performed on a relationship map.
Figure 11A:
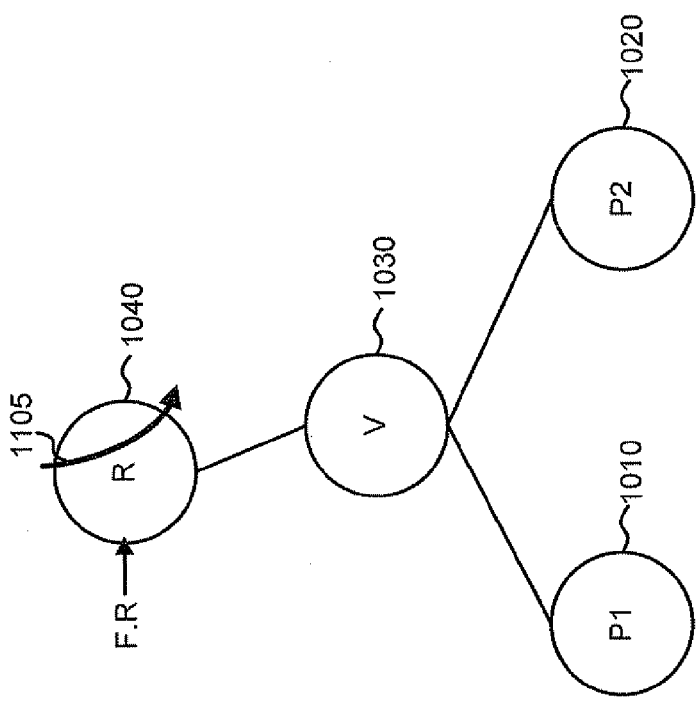
Figure 11C:
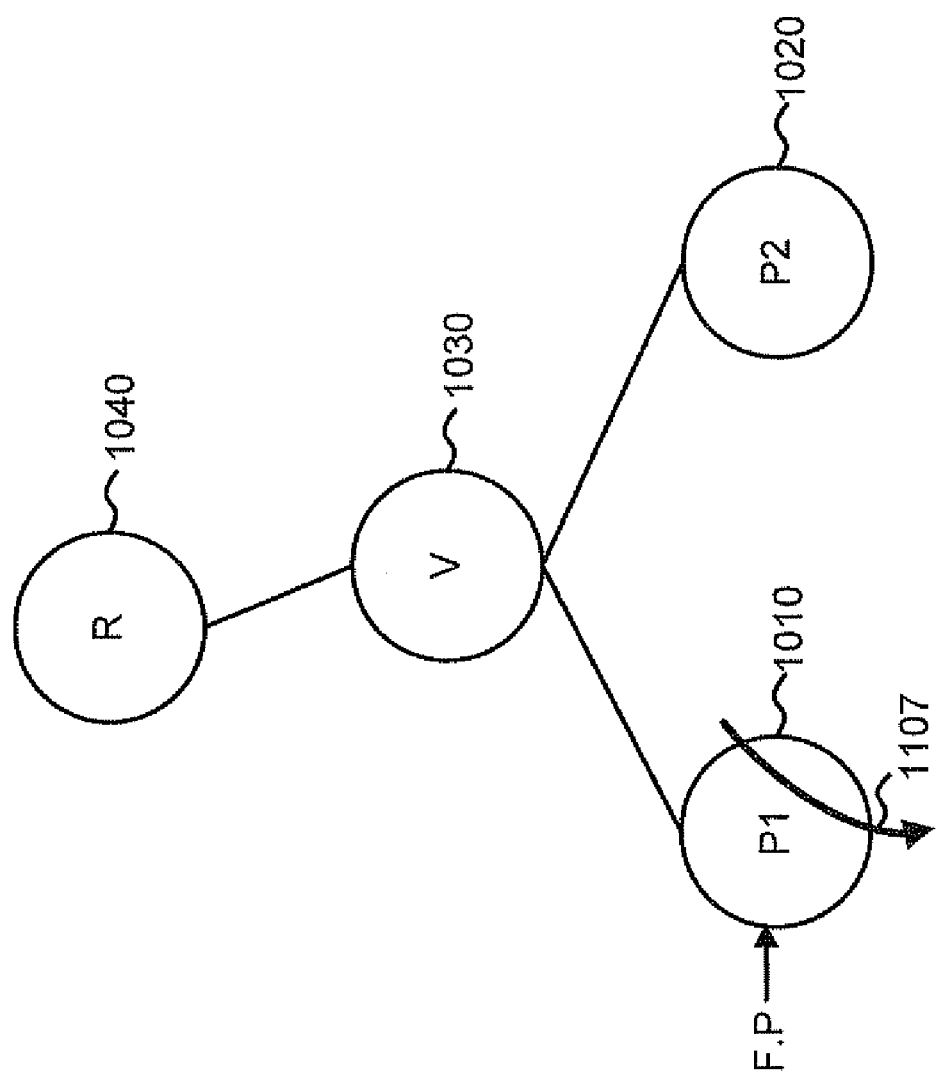

FIGS. 11A-11C are diagrams illustrating exemplary walks performed on a relationship map.

In FIG. 11A, the relationship map is the same map as shown in FIG. 10. Assume that bind-points 1010, 1030, and 1040 make up the bind-points that are part of a containment merge relationship. Further, assume a single filter F.R is associated with bind-point 1040. The possible walks through bind-points 1010, 1030, and 1040 are shown in FIG. 11A as curved line 1105. Walks that traverse bind-points that are not associated with filters may be omitted as the bind-points without filters do not have an impact on the filtering. Walk 1105 may correspond to the walk in which the data unit passes through bind-point 1040. The node representing this walk is a single merge point represented by the tuple [R, F.R].

In FIG. 11B, the relationship map is the same map as shown in FIG. 10. Again, assume that bind-points 1010, 1030, and 1040 make up the bind-points that are part of a containment merge relationship. Further, assume a single filter F.V is associated with bind-point 1030. Consequently, any data unit that passes through bind-point V 1030 will be subject to this filter. Walk 1106, shown with a solid curved line, corresponds to the walk in which the data unit passes through bind-point 1030. The node representing this walk is a single merge-point represented by the tuple [V, F.V].

In FIG. 11C, the relationship map is the same map as shown in FIG. 10. Again, assume that bind-points 1010, 1030, and 1040 make up the bind-points that are part of a containment merge relationship. Further, assume a single filter F.P is associated with bind-point P1 1010. Consequently, any data unit that passes through bind-point P1 1010 will be subject to this filter. Walk 1107, shown as solid curved line, corresponds to the walk in which the data unit passes through bind-point 1010. The node representing this walk is a single merge point represented by the tuple [P1, F.P].

The walks discussed with respect to FIGS. 11A through 11C are examples of non-composite walks where the walk passes through a single bind-point (i.e., only a single merge-point is active). Multiple merge points, can, however, be active, which may require merging of all the filters encountered in the walk.

FIGS. 12A-12D are diagrams illustrating exemplary composite walks performed on a relationship map. FIGS. 13A-13D are diagrams illustrating merge graphs corresponding to the relationship maps shown in FIGS. 12A-12D, respectively. In FIGS. 12A-12D, the relationship map is the same map as shown in FIG. 10.

Figure 12B:
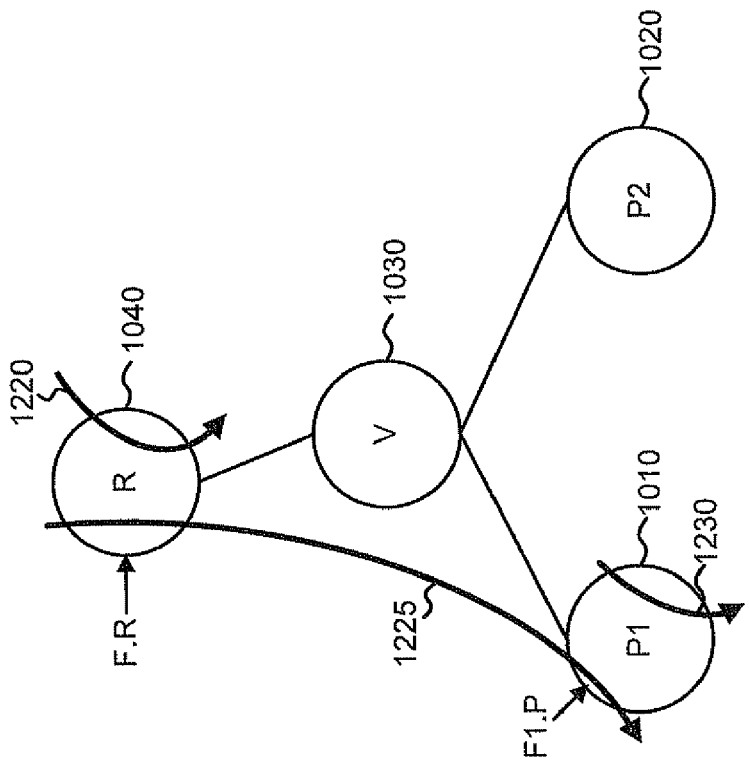
FIGS. 12A-12D are diagrams illustrating exemplary composite walks performed on a relationship map.
Figure 12A:
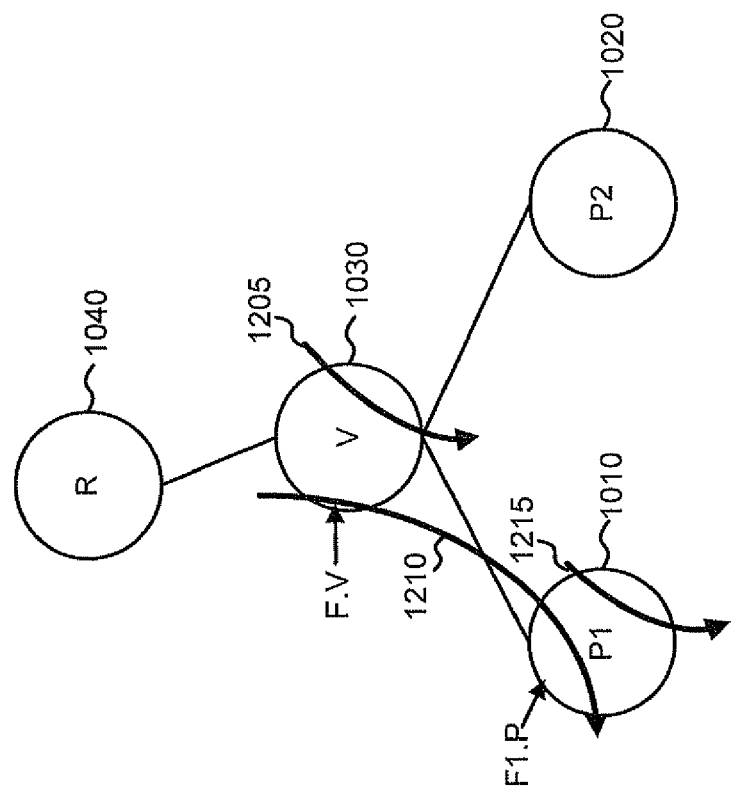

In FIG. 12A, assume that bind-points 1010, 1030, and 1040 make up the bind-points that are part of a containment merge relationship. Further, assume a filter F.V is associated with bind-point V 1030 and a filter F1.P is associated with bind-point P1 1010. The possible walks through bind-points 1010, 1030, and 1040 are shown in FIG. 12A as curved lines. Walk 1205 corresponds to the walk in which the data unit is switched by the VLAN (bind-point V 1030) and egresses through a port other than P1. Walk 1210 corresponds to the walk in which the data unit is switched by the VLAN (bind-point V 1030) and egresses through port P1 (bind-point P1 1010). Walk 1215 corresponds to the walk in which the data unit is switched by another VLAN and egresses through port P1 (bind-point P1 1010).

FIG. 13A is a diagram of the merge graph corresponding to the walks shown for FIG. 12A. The merge graph may include a node for each walk. Three nodes 1305, 1310, and 1315 are shown. Node 1305 includes the merge points associated with walk 1210 (merge-point [V, F.V] and [P1, F1.P]), node 1310 includes the merge points associated with walk 1205 (merge-point [V, F.V]), and node 1315 includes the merge points associated with walk 1215 (merge-point [P1, F1.P]).

In FIG. 12B, assume a filter F.R is associated with bind-point R 1040 and a filter F.P is associated with bind-point P1 1010. The possible walks through bind-points 1010, 1030, and 1040 are shown in FIG. 12A as curved lines. Walk 1220 corresponds to the walk in which the data unit passes through bind-point R 1040 and egresses through a port other than P1.

Walk 1225 corresponds to the walk in which the data unit is switched by the router (bind-point R 1040) and egresses through port P1 (bind-point P1 1010). Walk 1230 corresponds to the walk in which the data unit is switched by a router other than that associated with bind-point R 1040 and egresses through port P1 (bind-point P1 1010).

FIG. 13B is a diagram of the merge graph corresponding to the walks shown for FIG. 12B. Three nodes 1320, 1325, and 1325 are shown. Node 1320 includes the merge-points associated with walk 1225, node 1325 includes the merge-point associated with walk 1220, and node 1330 includes the merge-point associated with walk 1010.

Figure 12D:
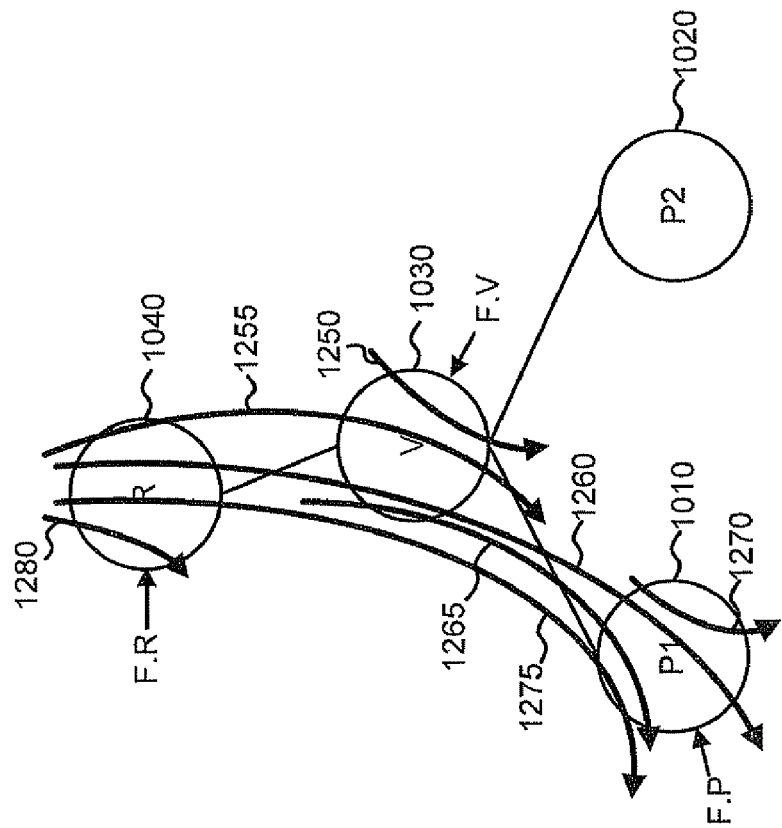
Figure 12C:
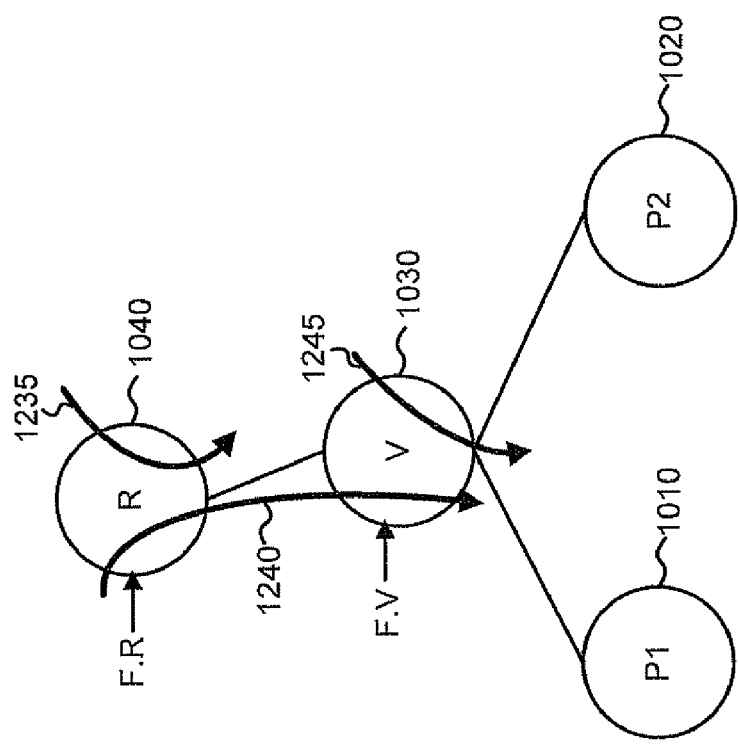

In FIG. 12C, assume a filter F.R is associated with bind-point R 1040 and a filter F.V is associated with bind-point V 1030. The possible walks through bind-points 1010, 1030, and 1040 are shown in FIG. 12C as curved lines. Walk 1240 corresponds to the walk in which the data unit passes through bind-point R 1040 and through the VLAN associated with bind-point V 1030, but egress through a port other than the port associated with bind-point P1 1010. Walk 1235 corresponds to the walk in which the data unit is routed by the router (bind-point R 1040) but is switched through a VLAN other than the VLAN associated with bind-point 1030 and egress through a port other than the port associated with bind-point P1 1010. Walk 1245 corresponds to the walk in which the data unit is switched by the VLAN associated with bind-point 1030 but is routed by a bind-point other than bind-point R 1040 and egresses through a port other than the port associated with bind-point P1 1010.

FIG. 13C is a diagram of the merge graph corresponding to the walks shown for FIG. 12C. Three nodes 1335, 1340, and 1345 are shown. Node 1335 includes the merge-points associated with walk 1240, node 1340 includes the merge-point associated with walk 1235, and node 1345 includes the merge-point associated with walk 1245.

In FIG. 12D, a filter is associated with each of bind-points 1010, 1030, and 1040. In particular, filter F.R is associated with bind-point 1040, filter F.V is associated with bind point 1030, and filter F1.P is associated with bind-point 1010. The possible walks through bind-points 1010, 1030, and 1040 are shown in FIG. 12D as curved lines. Walk 1250 corresponds to the walk in which the data unit is switched by the VLAN associated with bind-point 1030 but is routed by a bind-point other than bind-point 1040 and egresses on a port other than the port associated with bind-point 1010. Walk 1255 corresponds to the walk in which the data unit passes through bind-point R 1040 and through the VLAN associated with bind-point V 1030, but egresses at a port other than the port associated with bind-point 1010. Walk 1260 corresponds to the walk in which the data unit passes through bind-point R 1040, through the VLAN associated with bind-point V 1030, and egresses at the port associated with bind-point 1010. Walk 1265 corresponds to the walk in which the data unit is routed by a bind-point other than bind-point 1040 but passes through the VLAN associated with bind-point V 1030 and egresses at the port associated with bind-point 1010. Walk 1270 corresponds to the walk in which the data unit is routed by a bind-point other than bind-point 1040 and is switched through a VLAN other than the VLAN associated with bind-point V 1030, but egresses at the port associated with bind-point 1010. Walk 1275 corresponds to the walk in which the data unit is routed by bind-point 1040, is switched through a VLAN other than the VLAN associated with bind-point V 1030, and egresses at the port associated with bind-point 1010. Walk 1280 corresponds to the walk in which the data unit is routed by bind-point 1040 but is switched through a VLAN other than the VLAN associated with bind-point V 1030 and egresses at the port other than the port associated with bind-point 1010.

Figure 13D:
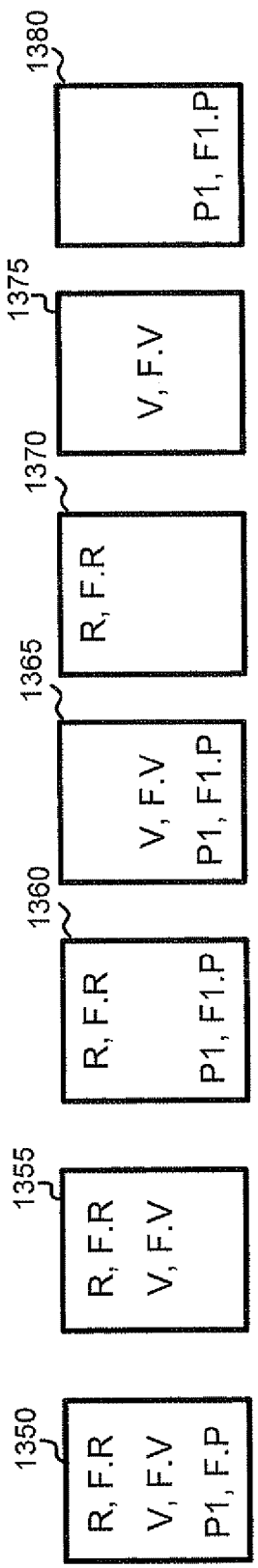

FIG. 13D is a diagram of the merge graph corresponding to the walks shown for FIG. 12D. Seven nodes 1350, 1355, 1360, 1365, 1370, 1375, and 1380 are shown. Node 1350 includes the merge-points associated with walk 1260, node 1355 includes the merge-points associated with walk 1255, node 1360 includes the merge-points associated with walk 1275, node 1365 includes the merge-points associated with walk 1265, node 1370 includes the merge-point associated with walk 1280, node 1375 includes the merge-point associated with walk 1250, and node 1380 includes the merge-point associated with walk 1270.

Referring back to FIG. 9, the merge graphs generated in block 930, such as the exemplary merge graphs shown in each of FIGS. 13A-13D, may be pruned (block 940). Firewall 200 may prune the merge graphs to remove nodes that are not relevant to the final set of TCAM entries or are not physically possible based on the topology of the network device. Firewall 200 may prune the merge graphs based on, for example, platform specific criteria or custom user defined rules. Additionally, the walks discussed with respect to FIGS. 11A through 11D were described as walks created as only covering bind-points that have filters associated with them. In some implementations, the walks may additionally be performed to include bind-points that do not have filters associated with them. In this case, pruning of the merge graphs may also be used to remove extra nodes corresponding to the bind-points that are not associated with filters.

As an example of pruning of the merge graph, consider the merge graph shown in FIG. 13D. Assume that bind-point R 1040 corresponds to a L3-IRB (integrated routing and bridging) bind-point and bind-point P1 1010 corresponds to an L2 port. In this situation, in the egress direction, a data unit routed at bind-point R 1040 must pass through the VLAN bind-point V 1030. Accordingly, nodes 1360 and 1370 in FIG. 13D (corresponding to walks 1275 and 1280) will never occur and firewall 200 may prune (remove) these nodes from the merge graph. After pruning, the walks through the relationship map and corresponding merge graph are shown in FIG. 14.

The merge graph generated in blocks 910 through 940 may represent an optimal set of filters that need to be merged. The filters from each node in the merge graph may be merged and TCAM entries generated for each node (block 950). Merging multiple filters to generate a "combined" filter that may be accessed in a single TCAM lookup was previously discussed with reference to FIGS. 7 and 8.

The TCAM entries for each node may be written to TCAM 410 (block 960). The TCAM entries may be written to TCAM 410 in an order that reflects the priority of the TCAM entries. The ordering of the entries corresponding to filters in the TCAM will be discussed in more detail below.

Spatial Ordering of Filters in the TCAM

As previously discussed, a filter may contain multiple terms. When instantiating these terms as entries in TCAM 410, there may exist an ordering constraint among terms in the filter. Specifically, terms appearing earlier in the filter may be converted to an entry in TCAM 410 that has a higher priority than a term appearing later in the filter. In general, independent filters for firewall 200 may not have an ordering constraint between them. However, for merged filters that correspond to a node in a merge graph, different nodes in the merge graph may be subject to an ordering constraint. For instance, nodes that include merged filters may have a higher priority than a node that represents an individual filter. Further, between two nodes that each includes merged filters, one of the nodes may have a higher priority than another of the nodes. In other words, nodes may need to be written to the TCAM in a manner that enforces a spatial (priority) ordering in the TCAM.

Moreover, when writing rules of a node to TCAM 410, rules or nodes may be sequentially written to TCAM 410. At any given time, however, the view of the merge graph that is programmed into TCAM 410 may be kept consistent with the merge graph maintained by the control portions, such as software portion 220, of firewall 200.

Figure 15:
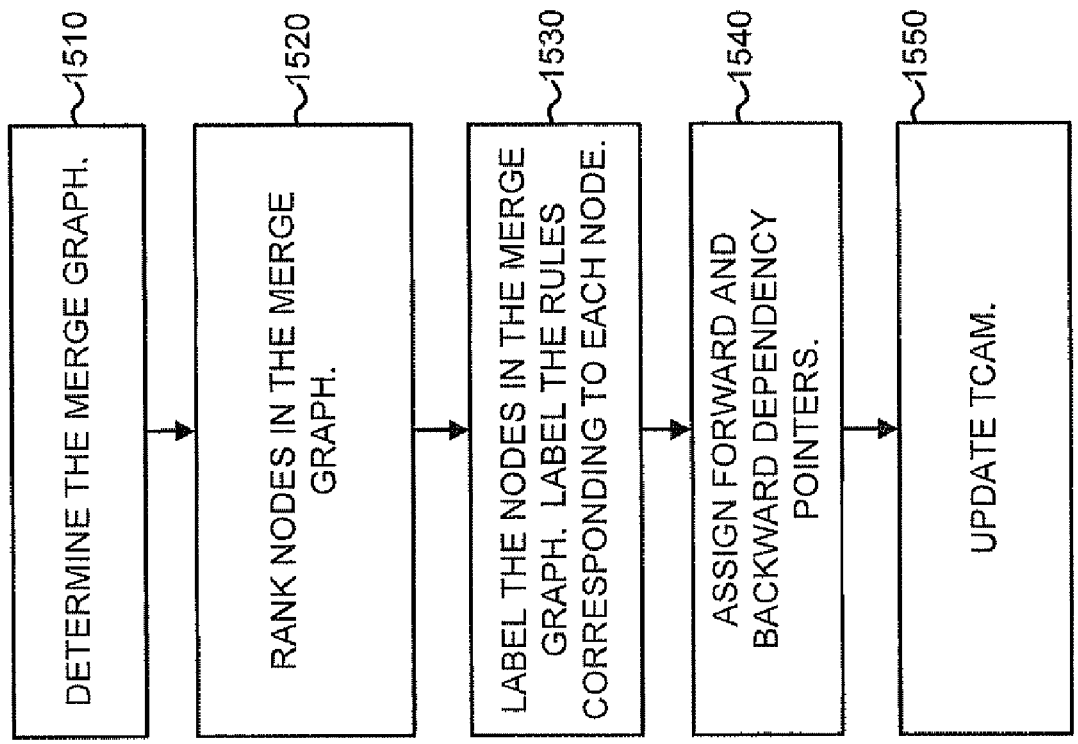
FIG. 15 is a flow chart illustrating exemplary operations for maintaining correct ordering of filters in the TCAM.

FIG. 15 is a flow chart illustrating exemplary operations for determining and maintaining the spatial ordering of nodes.

As shown, firewall 200 may determine a merge graph (block 1510). Generating a merge graph for a set of merge candidates was previously discussed above in connection with blocks 910-940 of FIG. 9. In some instances, the merge graph may be generated in response to a change in network topology or in response to changes in the configuration of firewall 200. In this situation, the merge graph may represent an updated version of the merge graph in which some of the nodes in the merge graph may be unchanged from the previous version. TCAM 410 may thus be updated by adding, deleting, or changing entries in TCAM 410 corresponding to changes in the updated merge graph.

Firewall 200 may rank nodes in the merge graph (block 1520). The ranks assigned to each node may be assigned so that the ranks correspond to a required spatial ordering in TCAM 410. In one implementation, each merge-point in a node of the merge graph may be assigned a rank. The final rank for the node may be calculated as a sum of the ranks assigned to the merge-points. The ranks for each merge-point may be assigned based on the type of interface associated with the merge-point. For instance, a different rank value may be used based on whether the interface is a RACL, VACL, or PACL interface. In one exemplary implementation, the rank value may be assigned as follows: RACL=3, VACL=2, PACL=1.

Figure 16:
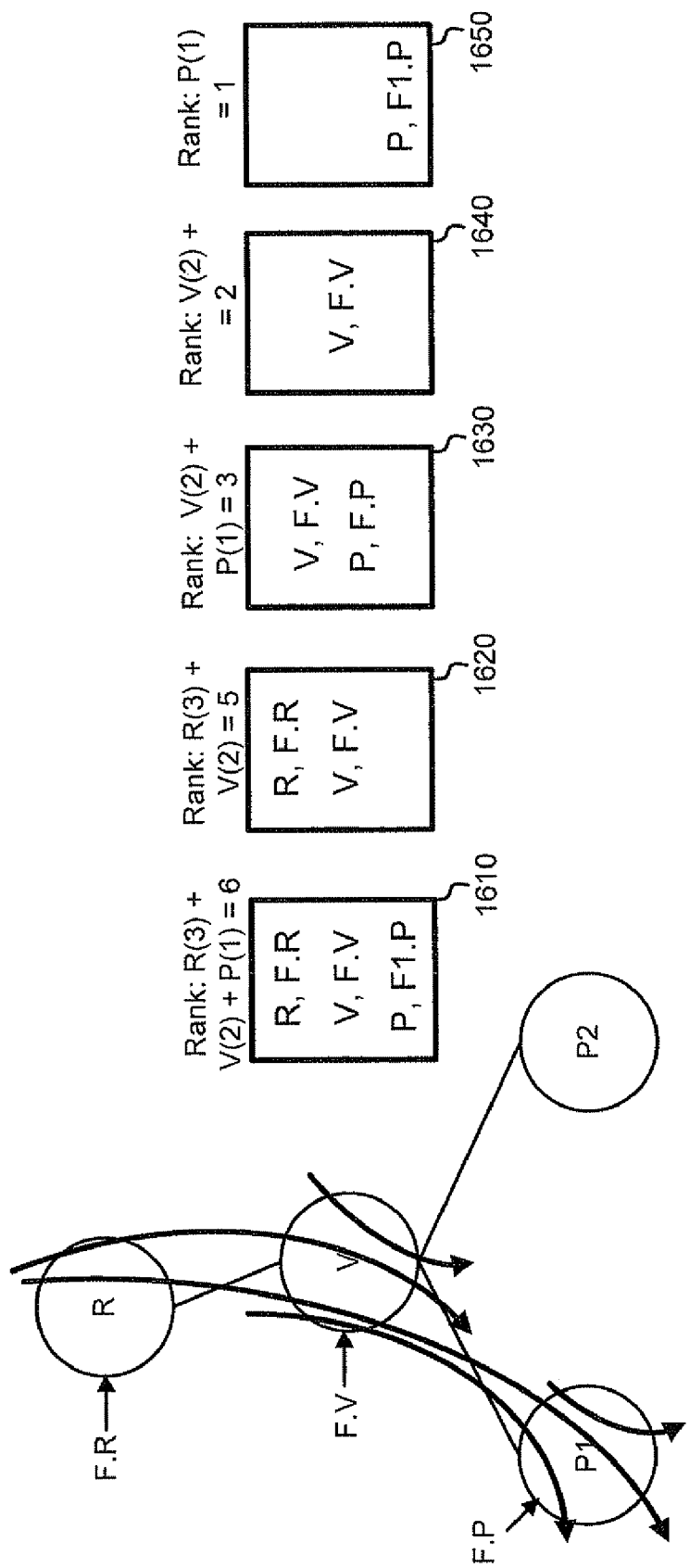
FIG. 16 is a diagram illustrating exemplary ranks assigned to nodes in a merge graph.

FIG. 16 is a diagram illustrating exemplary ranks assigned to nodes in a merge graph. In this example, the relationship map and corresponding merge graph are the same as that shown in FIG. 14. The merge graph includes five nodes, labeled as nodes 1610, 1620, 1630, 1640, and 1650. Node 1610 includes RACL, VACL, and PACL bind-points, and thus has a rank of 6 (3+2+1). Node 1620 includes RACL and VACL bind-points, and thus has a rank of 5 (3+2). In a similar manner, node 1630 has a rank of 3, node 1640 has a rank of 2, and node 1650 has a rank of 1. The rules (TCAM entries) corresponding to each node may thus be prioritized in TCAM 410 in order of the node ranks, in which higher ranking nodes have a higher priority in TCAM 410.

In the above description of assigning ranks to nodes in a merge graph, the rank for a node was based on a static initial selection of rank values for the merge-points corresponding to the node (i.e., RACL merge-points=3, VACL merge-points=2, PACL merge-points=1). In alternate possible implementations, however, the rank values for the merge points may be determined based on an algorithm that assigns rank values to merge-points based on the interface at which a merge-point is bound. For instance, it may be desirable to introduce the notion of "levels" in the bind-point relationship map, in which the router interface (R level), VLAN interface (V level), and port interface (P level) each correspond to a different level. It may be desirable to take the level into account when ranking nodes, such that, for instance, nodes are ordered in such a way that all nodes having active merge-points of a particular level appear before the nodes containing active merge-points of a different level. Furthermore, for a given level, nodes may be ranked according to the merge-order. Thus, it may be desirable to make sure that the first level the data unit will hit on its path is fully laid out in the merge graph before encountering nodes of the next level. For egress data units, the first level may be the R level and for ingress data units that first level may be the P level, Thus, for an egressing data unit, all nodes at the R level should be processed, followed by nodes at the V level, followed by nodes at the P level.

The level concept as pertaining to a node may be defined as the highest active level associated with that node. For instance, a node that includes the merge points (R, F.R), (V, F.V), and (P, F.P) is of level R and a node that includes the merge points (V, F.V) and (P, F.P) is of level V.

Consider a composite walk performed on the relationship map shown in FIG. 12D. FIG. 13D is a diagram of the merge graph corresponding to the walks shown for FIG. 12D, in which the nodes are ranked using the static ranking scheme discussed with respect to FIG. 16 (i.e., a static ranks of 3, 2, or 1 are assigned based on a RACL, VACL, or PACL bind point). As shown in the merge graph of FIG. 13D, the static ranking scheme ensures that the merged terms are ranked higher than the non-merged terms. In particular, node 1365 (merge points (V, F.V) and (P1, F1.P)) is ranked higher than node 1370 (merge point (R, F.R)). As previously mentioned, however, it may be desirable, in some implementations, to rank node 1370 higher than node 1365 as node 1370 include a higher level, R level, merge point (for egress data units).

Consistent with this "level selective" ranking scheme, a starting base rank value for the lowest level may be selected. For example, call this the BASE_RANK_LEVEL_0 and assign this base rank the value zero. For each merge point at the lowest level, a rank value may be incrementally assigned to each of the merge points. For instance, if there are N merge points at the lowest level P, the merge points will have the rank values of: BASE_RANK_LEVEL_0+1, BASE_RANK_LEVEL_0+2, . . . , BASE_RANK_LEVEL_0+N. For the next level, the base rank for this level, BASE_RANK_LEVEL_1, may be calculated as the sum of all ranks assigned to the previous level (LEVEL 0). Then, if there are M merge points at the next level V, the merge points will have the rank values of: BASE_RANK_LEVEL_1+1, BASE_RANK_LEVEL_1+2, . . . , BASE_RANK_LEVEL_1+M. Similarly, for the highest level, the base rank for this level, BASE_RANK_LEVEL_2, may be calculated as the sum of all ranks assigned to the previous level (LEVEL 1). With this ranking scheme, any rank assigned to a node in level X will be greater than the rank assigned to a node in any level below X.

As an example of the application of the level selective ranking scheme, consider the merge points shown in Table I, below. For these merge points, multiple filters are bound to the same bind point. Thus, the filters F.R and D.R are both part of merge points for the bind point R. Similarly, the filters F.V and D.V are both part of merge points for the bind point V, and filters F.P and D.P are both part of the merge points for the bind point P.

TABLE I

| Level | Merge Points |
| --- | --- |
| Level R (Level 2) | (R, F.R), (R, D.R) |
| Level V (Level 1) | (V, F.V), (V, D.V) |
| Level P (Level 0) | (P, F.P), (P, D.P) |

The ranks may then be assigned to the merge points as follows:

Base Rank Level 0=0: rank(P, F.P)=1, Rank (P, D.P)=2

Base Rank Level 1=0+(1+2)=3: Rank(V, F.V)=4, Rank (V, D.V)=5

Base Rank Level 2=3+(4+5)=12, Rank (R, F.R)=13, Rank (R, D.R)=14

The nodes in the merge graph may then be ranked by summing the ranks of each of the merge points in a node. For a fully merged scenario, the first node may include the merge points [(R, D.R), (R, F.R), (V, D.V), (V, F.V), (P, D.P), (P, F.P)], the second node may include the merge points [(R, D.R), (R.F.R), (V, D.V), (V, F.V), (P, D.P)], and so on through the rest of the R level nodes, then the V level nodes, and finally the P level nodes.

Referring back to FIG. 15, firewall 200 may label the nodes, and the rules corresponding to each node, in the merge graph (block 1530). The rules may be labeled in a manner that associates each rule with the node that contains the rule. For example, each node may be assigned a unique node identification label. Each rule may also be assigned a label, where the labels assigned to rules within a node can indicate a relative priority of the rules within the node. The label assigned to each rule may be appended with the label for the corresponding node to ensure that each rule is given a unique label.

Figure 17:
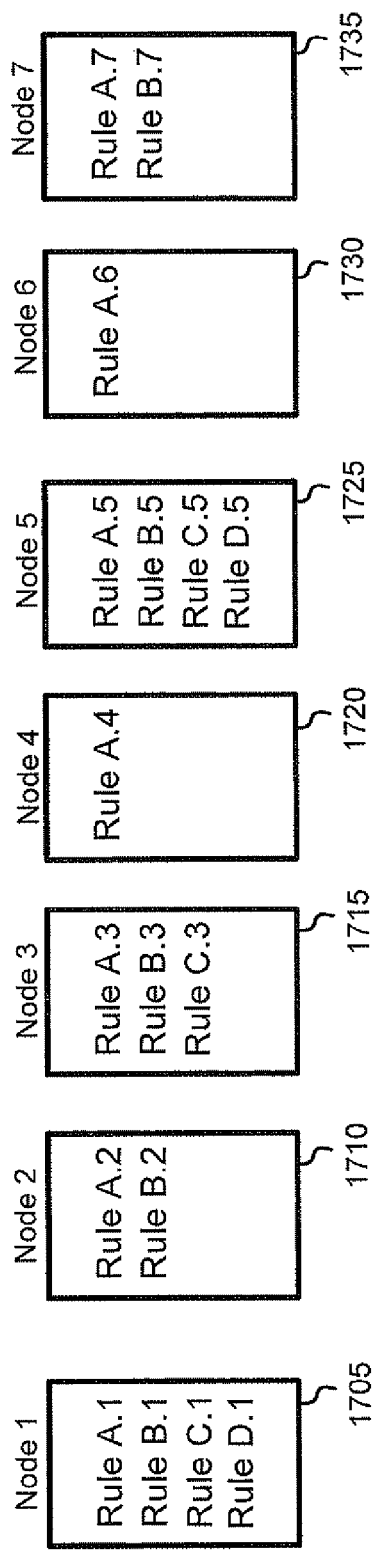
FIG. 17 is a diagram illustrating exemplary labeling of nodes in a merge graph.

FIG. 17 is a diagram illustrating exemplary labeling of nodes in a merge graph. Nodes 1705, 1710, 1715, 1720, 1725, 1730, and 1735 are shown for the merge graph illustrated in FIG. 17. Assume that the nodes are shown in ranked order, as determined in block 1520, where node 1705 is the highest ranking node and 1735 is the lowest ranking node. Each node 1705 through 1735 may be assigned a label ("1" through "7" in FIG. 17) unique to the node.

Node 1705 includes four rules, labeled as rules A, B, C, and D. That is, as discussed previously, the filter or filters associated with node 1705, after merging (if required) resulted in four entries that are to be written to TCAM 410. The label for each rule in node 1705 is additionally appended with the label for the node ("1"). Nodes 1710 through 1735 similarly may each include one or more rules that are appended with a label corresponding to the node.

Returning to FIG. 15, forward and backward dependency pointers may be assigned or associated with the nodes of the merge graph (block 1540). The forward and backward dependency pointers may be generally used to track ranks of the nodes relative to one another.

Figure 18:
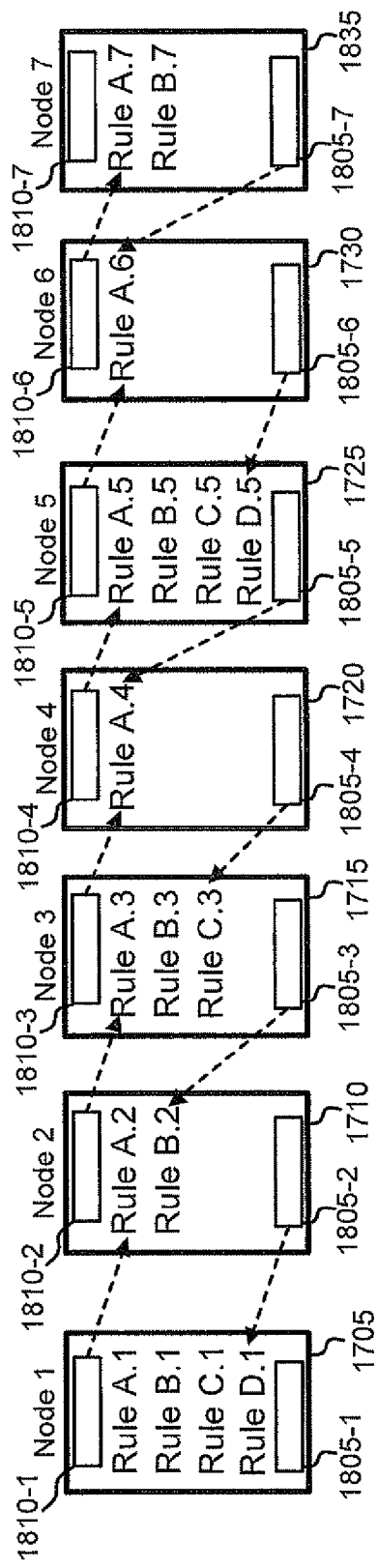
FIG. 18 is a diagram illustrating nodes in a merge graph that includes exemplary forward and backward dependency pointers.

FIG. 18 is a diagram illustrating nodes in a merge graph that includes exemplary forward and backward dependency pointers. As shown in FIG. 18, the forward and backward dependency pointers may be implemented as pointers associated with each node. More particularly, each of nodes 1705 through 1735 may additionally be associated with a pair of pointers: pointers 1805-1 though 1805-7 and pointers 1810-1 through 1810-7. Each of pointers 1805 may be a backward pointer that is set to point to the last rule of the previous node and each of pointers 1810-1 through 1810-7 may be a forward pointer that is set to point to the first rule of the next node. In this way, pointers 1805 and 1810 can be used to define the priority of the nodes in the merge graph. Starting from the first node, forward pointers 1810 can be followed to traverse each of the nodes in the merge graph in their rank order. Similarly, backward pointers 1805 can be followed to traverse each of the nodes in the merge graph in reverse. The backward pointer for the first node, 1805-1, and the forward pointer for the last node, 1810-7, may be set to a null or unassigned value.

As further shown in FIG. 15, TCAM 410 may be updated by firewall 200 (block 1550). To update TCAM 410, software portion 220 may send update commands to ASIC 305, where each update command may include a rule or the rules associated with a node. In some implementations, a TCAM manager component may also be implemented, where the TCAM manager component handles the updating of TCAM 410. In this situation, the TCAM manager component may receive and process the update commands. Within a node, the rule labels can be used to distinguish priority of the rules. The forward pointers 1810 and backward pointers 1805 may be used to keep track of the ordering of the nodes in TCAM 410. For example, when writing the rules to TCAM 410, the TCAM manager may traverse the linked-list defined by forward pointers 1810 and may write the rules for each node to TCAM 410 in a spatial (priority) order determined by the position of the node in the linked-list.

The merge graph, and hence the rules that are to be written to TCAM 410, may be dynamic and may change based on automatic or manual changes to the network topology. When this happens, firewall 200 may need to add, modify, or change the priority of the rules stored in TCAM 410. In this situation, the current version of the merge graph may not correspond to the rules programmed into TCAM 410 until all of the update commands have been received and processed by TCAM 410. However, the TCAM view of the nodes may be kept consistent with that maintained by software portion 220, ASIC 305, and/or the TCAM manager.

Figure 19:
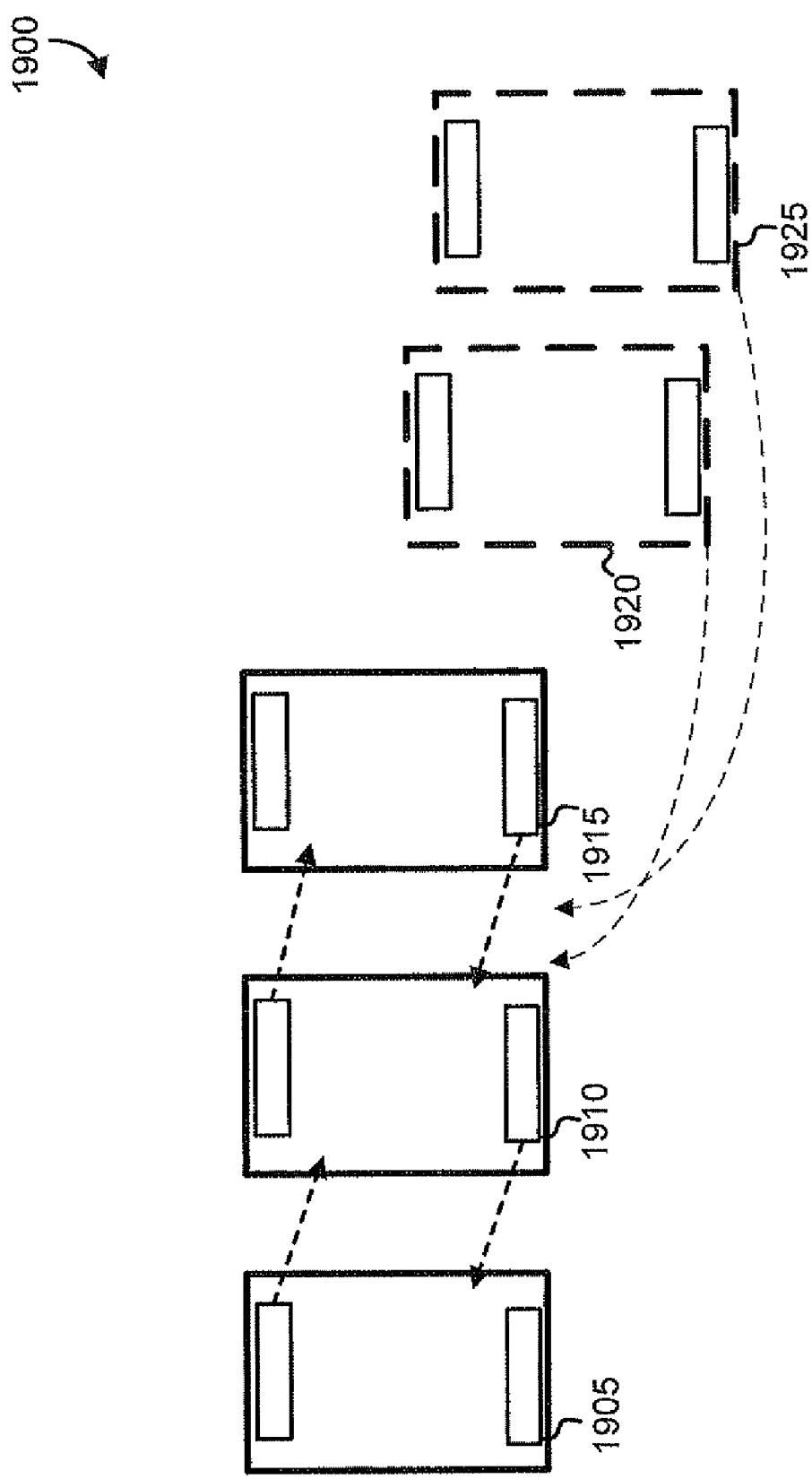
FIG. 19 is a diagram illustrating an exemplary merge graph that is partially programmed into the TCAM.

FIG. 19 is a diagram illustrating an exemplary merge graph 1900 that may be partially programmed into TCAM 410. As shown in FIG. 19, merge graph 1900 may include nodes 1905, 1910, 1915, 1920, and 1925. Assume that nodes 1905, 1910, and 1915 are "original" nodes in merge graph 1900 that are programmed into TCAM 410. Further assume that due to a change in the network, nodes 1920 and 1925 are to be added to TCAM 410, where node 1920 is to be added between nodes 1910 and 1915 and node 1925 is to be added between nodes 1920 and 1915.

At steady state, before the change in merge graph 1900, merge graph 1900 may include nodes 1905, 1910, and 1915, and this view of the merge graph may be consistent with the view stored by TCAM 410. As new nodes 1920 and 1925 are added to TCAM 410, however, merge graph 1900, as programmed into TCAM 410, may not be consistent with merge graph 1900. The dependency view implemented by the forward and backward dependency pointers, in particular, may not match the view held by TCAM 410. For instance, after the addition of node 1920, the next node seen by TCAM 410 for node 1920 may be node 1915, while the next node in the complete dependency view for node 1920 may be node 1925.

In one implementation, to handle the inconsistent dependency views between the TCAM and the calculated merge graph, firewall 200 may use temporary "anchor points" to ensure that changes to TCAM 410 are performed in conformance to the TCAM view of the nodes of the merge graph. Anchor points are described in detail below with reference to FIG. 20.

Figure 20:
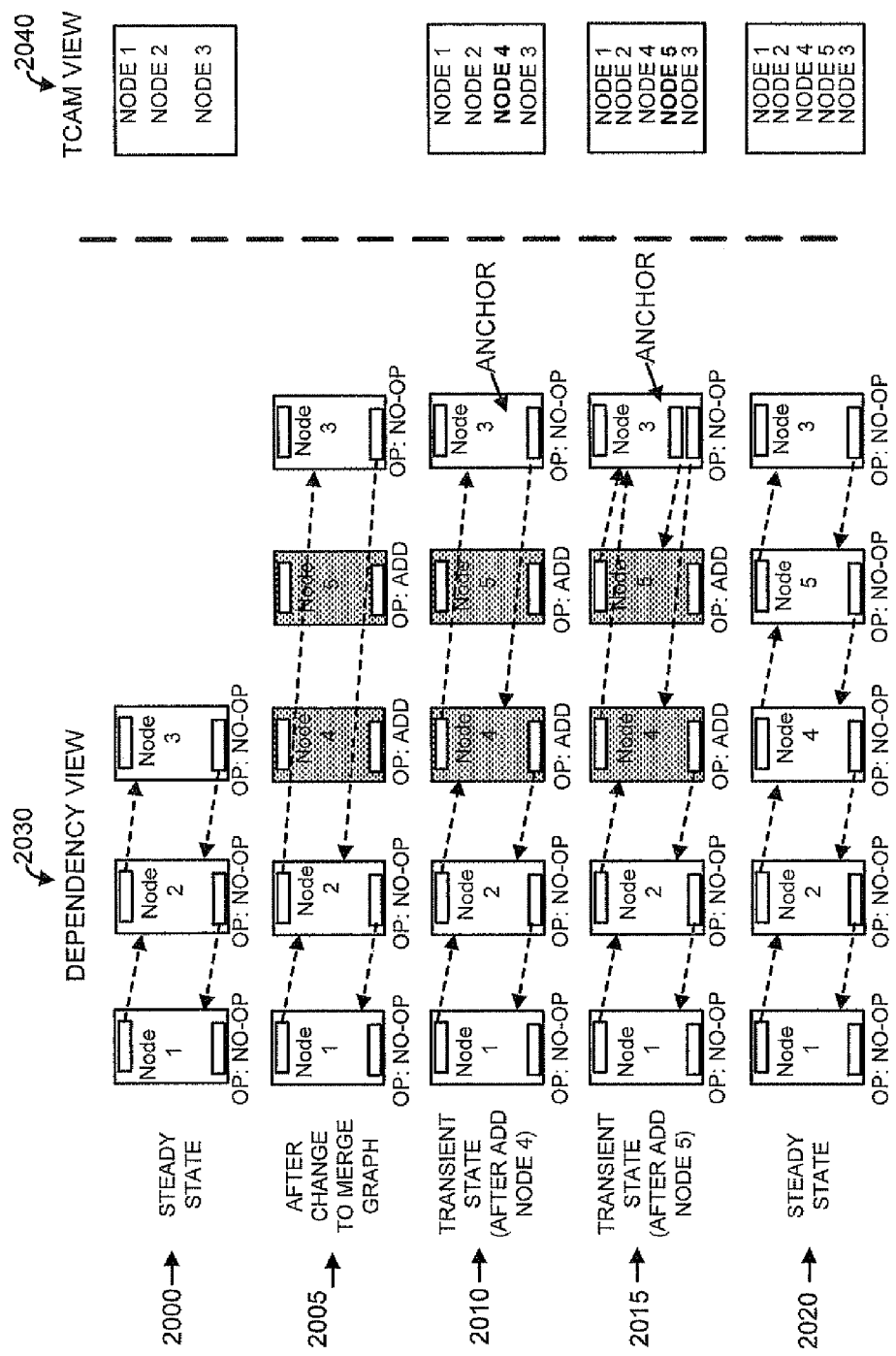
FIG. 20 is a diagram illustrating an exemplary time series of dependency views that are visited when updating the TCAM

FIG. 20 is a diagram illustrating an exemplary time series of dependency views that are visited when updating TCAM 410. Five states are shown in FIG. 20: state 2000, state 2005, state 2010, state 2015, and state 2020. Each state 2000 through 2020 includes a dependency view 2030, which corresponds to the current state of the merge graph, and a TCAM view 2040, which corresponds to the current programmed state of TCAM 410.

Assume that state 2000 corresponds to a steady state condition, in which three nodes, labeled as nodes 1, 2, and 3 make up the current merge graph. Forward pointers and backward pointers illustrate the dependency links Further, assume that each node is associated with an operation ("op") that indicates the type of operation that is to be performed for the node. Because this is a steady state condition, the operation for the nodes in state 2000 are "no-op", meaning no operation is associated with the nodes. TCAM view 2040 for state 2000 may be the same as dependency view 2030. In other words, TCAM 410 may be programmed to include the rules for all the nodes in the priority order shown by the dependency links.

State 2005 may correspond to a state of firewall 200 after a change in the merge graph. For example, the bind-points or filters for firewall 200 may have been manually changed by a user or automatically changed in response to a change in network traffic or topology. In this example, two new nodes, nodes 4 and 5, have been added to the merge graph. Assume that based on the rank values calculated for the nodes in the merge graph, node 4 should be added after node 2 and node 5 should be added after node 4. Node 3 is after node 5. The operation associated with nodes 4 and 5 is "add", meaning that ASIC 305 may write the rules corresponding to the nodes in a correct spatial order in TCAM 410. The add operations may be submitted to TCAM 410 in a priority order of the nodes, i.e., the add operation for node 4 may be submitted before the add operation for node 5.

State 2010 may correspond to a state of firewall 200 after the adding of node 4 to TCAM 410. As shown in TCAM view 2040, node 4 may now be programmed into TCAM 410 between nodes 2 and 3. In order to maintain consistency between TCAM view 2040 and dependency view 2030, an anchor point ("anchor") may be defined for the dependency view, where the anchor point for a node that is in an active state (a non no-op state) is defined for that node as the next forward node in the merge graph that is in an inactive state (a no-op state). As shown for node 4 in state 2010, the anchor point for this node is node 3. The forward pointer for node 4 may point to the anchor point, i.e., node 3.

State 2015 may correspond to a state of firewall 200 after the adding of node 5 to TCAM 410. As shown in TCAM view 2040, node 5 may now be programmed into TCAM 410 between nodes 4 and 3. The anchor point for this node is also node 3. The forward pointer for node 5 may thus be set to node 3 in dependency view 2030. At this point, node 3 is thus the anchor point for both nodes 4 and 5. The backward dependency for node 5 (not shown), may point to node 5.

In an alternative implementation, rules could also be added in the reverse direction, i.e., going from node 5 to node 4. In this case, the anchor point would be chosen to the left of node 4 (i.e., node 2).

State 2020 represents a steady state for nodes 1 through 5. At this point, the operations to update TCAM 410 have completed and the merge graph is back to a steady state condition. Firewall 200 may reset the forward and backward links in dependency view 2030 to normal. In other words, the anchor points may be removed and the forward and backward dependency links may be set as described above in connection with FIG. 18.

The spatial (priority) ordering, as described above, may determine node ranks within a merge graph based on a ranking value calculated for each node. Labels that indicate spatial order may further be assigned to each rule within a node. The spatial order between nodes may be maintained as pointers that allow the nodes to be managed as linked lists. With this technique, correctness in terms of ordering of the TCAM rule-set under static and dynamic conditions can be maintained.

CONCLUSION

Although the above description was explained in the context of firewalls, it can be appreciated that the concepts discussed herein may be applicable to similar problem classes in which a TCAM-based lookup system is employed to service multiple features with a smaller number of lookup resources.

While series of acts have been described with regard to FIGS. 9 and 15, the order of the acts may be varied in other implementations. Moreover, non-dependent acts may be implemented in parallel.

It will also be apparent that aspects described herein may be implemented in many different forms of software, firmware, and hardware in the implementations illustrated in the figures. The actual software code or specialized control hardware used to implement aspects described herein is not intended to limit the scope of the invention. Thus, the operation and behavior of the aspects were described without reference to the specific software code—it being understood that software and control hardware can be designed to implement the aspects based on the description herein.

Further, certain aspects described herein may be implemented as "logic" or as a "component" that performs one or more functions. This logic or component may include hardware, such as an application specific integrated circuit or a field programmable gate array, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A network device comprising:
   one or more processors to:
      identify a merge graph that includes one or more nodes,
         a particular node, of the one or more nodes, including
            a plurality of merge-points, and
         a particular merge-point, of the plurality of merge-points, being defined as a filter associated with an interface in the network device,
      assign values to the plurality of merge-points;
      determine a sum of the values;
      determine a ranking of the one or more nodes based on the sum of the values;
      program a ternary content-addressable memory (TCAM) based on the ranking of the one or more nodes in the merge graph,
         the particular node being represented in the TCAM by one or more entries programmed into the TCAM, and
         the one or more entries having a priority order that is based on the ranking of the one or more nodes; and
      process traffic based on the priority order of the one or more entries in the TCAM.

2. The device of claim 1, where, when assigning the values to the plurality of merge-points, the one or more processors are to:

determine a particular value, of the values, based on the interface of the particular merge-point in the network device, and assign the particular value to the particular merge-point.

3. The device of claim 1, where the interface is associated with at least one of a router-level access control list (RACL), a virtual local area network (VLAN)-level access control list (VACL), or a port-level access control list (PACL).

4. The device of claim 1,
where the particular merge point is associated with a particular level,
where the ranking indicates that the particular merge-point is ranked higher than other merge-points that are not associated with the particular level, and
where the particular level is associated with a router-level access control list (RACL) or a port-level access control list (PACL).

5. The device of claim 1, where the one or more processors are further to:
associate dependency pointers with the one or more nodes to track relative ranks of the one or more nodes.

6. The device of claim 5, where the dependency pointers include:
a forward dependency pointer that points to a next node in a ranked set of nodes, and
a backward dependency pointer that points to a previous node in the ranked set of nodes,
the ranked set of nodes including the one or more nodes.

7. The device of claim 1, where the one or more processors are further to:
assign labels to the one or more TCAM entries based on the priority order.

8. The device of claim 1, where an entry, of the one or more TCAM entries, represents a rule corresponding to the filter or a merged set of filters.

9. The device of claim 1, where the interface represents a logical interface or a physical interface of the network device.

10. A method comprising:
identifying, by one or more devices, a merge graph that includes one or more nodes,
a particular node, of the one or more nodes, including a plurality of merge-points, and
a particular merge-point, of the plurality of merge-points, being defined as a filter associated with an interface;
assigning, by the one or more devices, values to the plurality of merge-points;
determining, by the one or more devices, a sum of the values;
determining, by the one or more devices, a ranking of the one or more nodes based on the sum of the values;
updating, by the one or more devices, entries of a ternary content-addressable memory (TCAM) based on the ranking of the one or more nodes,
the particular node being represented by one or more of the entries, and
the entries being associated with a priority order that is based on the ranking of the one or more nodes; and
processing, by the one or more devices, traffic based on the priority order of the entries.

11. The method of claim 10, where the interface includes a logical interface or a physical interface.

12. The method of claim 10, where assigning the values to the plurality of merge-points includes:
determining a particular value, of the values, based on the interface of the particular merge-point and quantity of the plurality of merge points, and
assigning the particular value to the particular merge point.

13. The method of claim 10, where the interface is associated with at least one of a router-level access control list (RACL), a virtual local area network (VLAN)-level access control list (VACL), or a port-level access control list (PACL).

14. The method of claim 10, further comprising:
associating dependency pointers with the one or more nodes to track relative ranks of the one or more nodes.

15. The method of claim 14, where the dependency pointers include:
a forward dependency pointer that points to a next node in a ranked set of nodes, and
a backward dependency pointer that points to a previous node in the ranked set of nodes,
the ranked set of nodes including the one or more nodes.

16. The method of claim 14, where updating the entries includes:
maintaining a correspondence between the TCAM and the merge graph by setting the dependency pointers to point to fixed nodes in the merge graph until the updating is complete.

17. A device comprising:
one or more processors to:
identify a merge graph including nodes,
a particular node, of the nodes, including a plurality of merge-points, and
a particular merge-point, of the plurality of merge-points, being defined as a filter associated with an interface in the device;
assign values to the plurality of merge-points;
determine a sum of the values;
determine a ranking of the one or more nodes based on the sum of the values;
assign, based on the ranking of the nodes, labels to entries corresponding to the nodes,
the entries including one or more entries, in a ternary content-addressable memory (TCAM), that represent the particular node, and
the entries being associated with a priority order that is based on the ranking of the one or more nodes;
process traffic based on the priority order of the entries.

18. The device of claim 17, where the device includes a firewall, a router, or a switch.

19. A non-transitory computer-readable medium comprising:
one or more instructions that, when executed by at least one processor, cause the at least one processor to:
identify a merge graph that includes one or more nodes,
a particular node, of the one or more nodes, including a plurality of merge-points, and
a particular merge-point, of the plurality of merge-points, being defined as a filter associated with an interface in a network device;
assign values to the plurality of merge-points;
determine a sum of the values;
determine a ranking of the one or more nodes based on the sum of the values;
update entries of a ternary content-addressable memory (TCAM) based on the ranking,
the particular node being represented by one or more of the entries, and
the entries being associated with a priority order that is based on the ranking of the one or more nodes; and
process traffic based on the priority order of the entries.

20. The network device of claim 1,
where a first entry of the one or more entries is associated with a first action, where a second entry of the one or more entries is associated with a second action that is different from the first action, and where the priority order indicates that a first priority of the first entry is higher than a second priority of the second entry.

21. The network device of claim 20, where, when processing the traffic, the one or more processors are further to:

process the traffic based on only the first action when conditions associated with the first entry and conditions associated with the second entry are satisfied.

22. The method of claim 10, where a first entry of the entries is associated with a first action, and where a second entry of the entries is associated with a second action that is different from the first action.

23. The method of claim 22, where processing the traffic includes:

determining, based on the traffic, a first match to the first entry, determining, based on the traffic, a second match to the second entry, determining, based on the priority order, that a first priority of the first entry is higher than a second priority of the second entry, and process the traffic based on the first action after determining that the first priority of the first entry is higher than the second priority of the second entry.

\* \* \* \* \*